US012336079B2

(12) United States Patent
Westrick, Jr. et al.

(10) Patent No.: US 12,336,079 B2
(45) Date of Patent: Jun. 17, 2025

(54) LOW BATTERY MODE FOR WIRELESS CONTROL SYSTEM

(71) Applicant: ABL IP HOLDING LLC, Atlanta, GA (US)

(72) Inventors: Richard L. Westrick, Jr., Social Circle, GA (US); Frank Pelliccio, Guilford, CT (US); Ryan A. Zaveruha, Trumbull, CT (US); Maurits van der Hoorn, Alberta (CA)

(73) Assignee: ABL IP HOLDING LLC, Conyers, GA (US)

( * ) Notice: Subject to any disclaimer, the term of this patent is extended or adjusted under 35 U.S.C. 154(b) by 164 days.

(21) Appl. No.: 18/108,936

(22) Filed: Feb. 13, 2023

(65) Prior Publication Data

US 2023/0269854 A1  Aug. 24, 2023

Related U.S. Application Data

(60) Provisional application No. 63/417,502, filed on Oct. 19, 2022, provisional application No. 63/311,584, filed on Feb. 18, 2022.

(51) Int. Cl.
*H05B 47/17* (2020.01)
*H05B 47/185* (2020.01)
*H05B 47/19* (2020.01)

(52) U.S. Cl.
CPC .......... *H05B 47/17* (2020.01); *H05B 47/185* (2020.01); *H05B 47/19* (2020.01)

(58) Field of Classification Search
CPC ....... H05B 47/17; H05B 47/185; H05B 47/19
See application file for complete search history.

(56) References Cited

U.S. PATENT DOCUMENTS

| 9,820,361 | B1 | 11/2017 | Turvy, Jr. et al. | |
|---|---|---|---|---|
| 9,883,570 | B1 | 1/2018 | Turvy, Jr. et al. | |
| 11,115,899 | B1* | 9/2021 | Sanders | H04W 60/04 |
| 11,689,339 | B2* | 6/2023 | Uhling | H04L 1/1621 |
| | | | | 370/329 |
| 2010/0301774 | A1* | 12/2010 | Chemel | H05B 47/155 |
| | | | | 315/297 |
| 2010/0327766 | A1* | 12/2010 | Recker | H04L 7/0004 |
| | | | | 362/20 |

* cited by examiner

*Primary Examiner* — Monica C King
(74) *Attorney, Agent, or Firm* — Buchanan Ingersoll & Rooney PC

(57) ABSTRACT

A luminaire or lighting control device includes a network interface with a transceiver configured for communication via a lighting control network for lighting control and systems operations. The device can include a light source to emit illumination lighting, a driver circuit to control operation of the light source, and a power supply. The device includes a processor coupled to the network interface, and a memory accessible to the processor that stores a battery level threshold. The device includes programming in the memory. Execution of the programming by the processor configures the device to implement the following functions. First, the device receives a lighting control message. Second, the device determines a battery level of a power switch. Finally, in response to the battery level of the power switch being less than the battery level threshold, the device controls the luminaire or another luminaire to enter a low battery mode.

15 Claims, 10 Drawing Sheets

LOW BATTERY MODE FOR WIRELESS CONTROL SYSTEM

CROSS-REFERENCE TO RELATED APPLICATIONS

This application claims priority to U.S. Provisional Patent Application No. 63/311,584, filed on Feb. 18, 2022, and to U.S. Provisional Patent Application No. 63/417,502, filed on Oct. 19, 2022, both titled "LOW BATTERY MODE FOR WIRELESS CONTROL SYSTEM," the entire disclosures of which are incorporated herein by reference.

TECHNICAL FIELD

The present subject matter relates to networked lighting devices, luminaires incorporating remote battery-operated controls, and techniques of operating such equipment to provide illumination lighting.

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some luminaires, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

In some implementations, those luminaires are controlled by a battery-powered controller, connected to the luminaire over a wireless connection. However, batteries lose charge over time, and the battery-powered controller may perform unpredictably, or not at all when the battery is depleted. This unpredictable behavior can have severe impacts in certain situations. For example, during emergency conditions, a building (e.g., school or office building) may require evacuation as quickly and safely as possible. However, if the lighting controls do not operate, then the egress paths cannot be illuminated when most needed—stairs, aisles, hallways, ramps, escalators, walkways, and exit passages. Such pathways for egress and exit signage are needed to guide and direct occupants of the building to a public way (e.g., street).

In non-emergency scenarios, a failure of the lighting controls due to low battery power is still very undesirable, in particular if it leaves occupants in darkness, rather than in light. Lighting controls such as battery-powered light switches can often have long-lived battery lives, and therefore the punctual replacement of functional batteries at risk of full depletion may be forgotten by maintenance professionals. Therefore, during the service life of a lighting control system with battery-powered lighting controls, a battery failure scenario due to low battery power in a lighting control is likely without fastidious maintenance.

Currently with luminaires, as per the National Electric Code (NEC) standards in the industry for lighting controls, at least one lighting outlet controlled by a listed wall-mounted control device shall be installed in every habitable room, kitchen, and bathroom. Battery-powered control devices have become increasingly common in these areas, and as a result, updated standards for the NEC are being considered which will allow for battery-powered control devices: provided the battery-powered control devices does not rely exclusively on the battery unless a means is provided for automatically energizing the lighting outlets upon battery failure caused by low battery power within the battery-powered control devices.

Conventional wall switches and luminaires communicate over wired systems. More recent lighting systems are wireless, which allow communication over a radio frequency (RF) network. Regarding wireless lighting control systems, U.S. Pat. No. 9,820,361, issued on Nov. 14, 2017, titled "Wireless Lighting Control System," to applicant ABL IP Holding, LLC, which is incorporated by reference as if fully set forth herein, describes a wireless lighting control system that is commissioned over a commissioning network and is controlled over a wireless lighting control network. U.S. Pat. No. 9,883,570, issued on Jan. 30, 2018, titled "Protocol for Lighting Control via a Wireless Network," to applicant ABL IP Holding, LLC, which is incorporated by reference as if fully set forth herein, describes a wireless lighting control system with lighting control groups. However, the described wireless lighting control system does not address a responsive strategy to the battery-powered control devices with low battery levels behaving unpredictably.

One method of automatically energizing luminaires upon battery failure due to low battery power in a battery-powered control device is to have the battery-powered control device monitor its battery and send a "last gasp" message to turn on the luminaires when the battery level falls below a certain threshold. However, this approach has a number of shortcomings: it fails to account for different RF environments and installation conditions which might affect the effective range of the battery-powered switch transmission; the "last gasp" message might be missed by some luminaires due to transient RF interference; and it may cause the lights to be overridden ON at a disruptive or inconvenient time. Accordingly, efficient and robust lighting control systems are desired for lighting to operate in a desired manner when a battery-powered control device has a depleted battery to overcome these and other limitations in the art.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
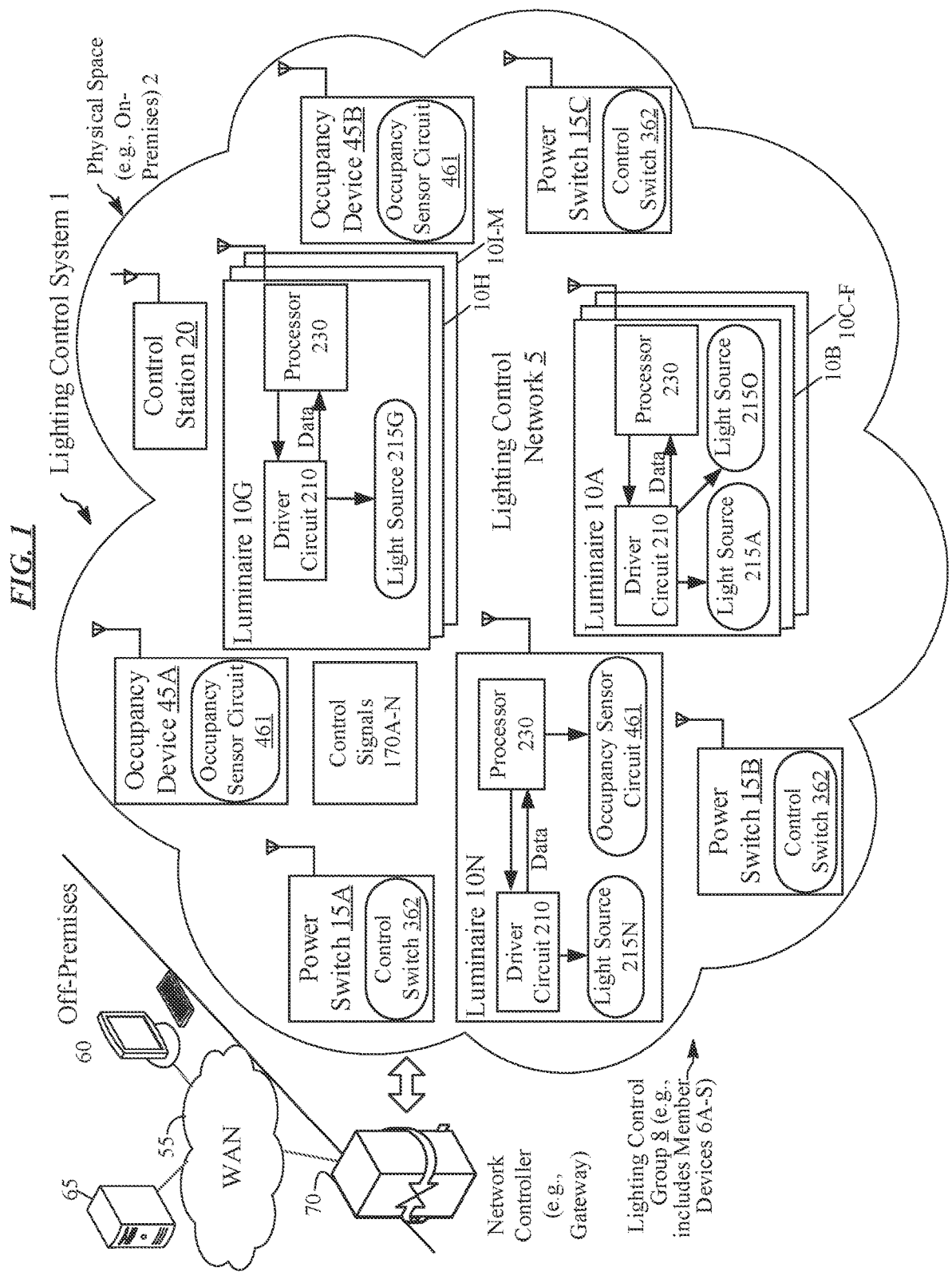
FIG. 1 is a high-level functional block diagram of an example of a lighting control system including battery-powered power switches that control luminaires illuminating a physical space.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher-level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting control system" or "lighting system" as used herein, is intended to encompass essentially any type of system that either is configured to include a number of such luminaires configured to be coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting" or "illumination lighting" as used herein, are intended to encompass essentially any type of lighting in which a luminaire produces light by processing of electrical power to generate the light. A luminaire for artificial lighting or illumination lighting, for example, may take the form of a lamp, light fixture, or other luminaire that incorporates a light source such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light-based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher-level control circuitry, and/or data communication interface(s). The electronics for driving and/or or controlling the lighting component(s) may be incorporated within the luminaire or located separately and coupled by appropriate means to the light source component(s).

The term "coupled" as used herein refers to any logical, optical, radio frequency, physical, or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 is a high-level functional block diagram of an example of a lighting control system 1 that includes fourteen luminaires 10A-N, three power switches 15A-C, two occupancy devices 45A-B, a gateway 70, and supports a low battery luminaire activation protocol 700 (see FIG. 7) for lighting control during low battery control device scenarios. The numbers of elements within the lighting control system 1 are for illustrative purposes only: any number of luminaires, power switches, occupancy device, gateways, and other networked devices can be included in the lighting control system 1. Lighting control system 1 provides a variety of lighting controls of a lighting control group 8 over a separate lighting control network, and may support light commissioning/maintenance network communication over the lighting control network 5. In the example, the lighting control group 8 includes nineteen member devices 6A-S (fourteen luminaires 10A-N, three power switches 15A-C, and two occupancy devices 45A-B). Lighting control communication include communications in support of turning lights on/off, dimming, set scene, and sensor trip events.

The control group 8 includes occupancy devices 45A-B (further described in FIG. 4), which are occupancy, motion, ozone, daylight, or audio detector(s) 47, to enable controls for occupancy and intensity adjustment of the illumination lighting 19. The control station 20 (further described in FIG. 5) includes user interface elements (e.g., switches 561) to allow an operator to optionally configure the lighting control group 8, and ultimately energize the luminaires 10A-N in order to emit illumination lighting 19.

Each control device of the control group 8 is physically connected to the lighting control network 5, which can be a wired network via communication wires or cables (ex: CAT5 cable) or enabled for wireless network communication (ex: BLUETOOTH® Low Energy (BLE), Wi-Fi, near field communication (NFC), optical communication, sub-Gigahertz (sub-GHz or sub-gig in the range of less than 1 GHz down to and including 400 MHz, in particular including the 900 MHz Industrial, Scientific and Medical (ISM) range), ZigBee™, Z-Wave™ etc.). Therefore, the lighting control system 1 may comprise of all wired connected control devices, wireless only connected devices, or hybrid combination of both wired and wireless control devices. The occupancy devices 45A-B can include a traditional passive infrared motion sensor (PIR) enhanced with microphonics, an audio detector circuit, for improved reliability of motion and occupancy sensing. In other embodiments, the motion sensors of the occupancy devices 45A-B may be based on ultrasonic, ultra-wide band (UWB), radar, optical, stereoscopic, or other motion or occupancy sensing technologies.

Figure 2:
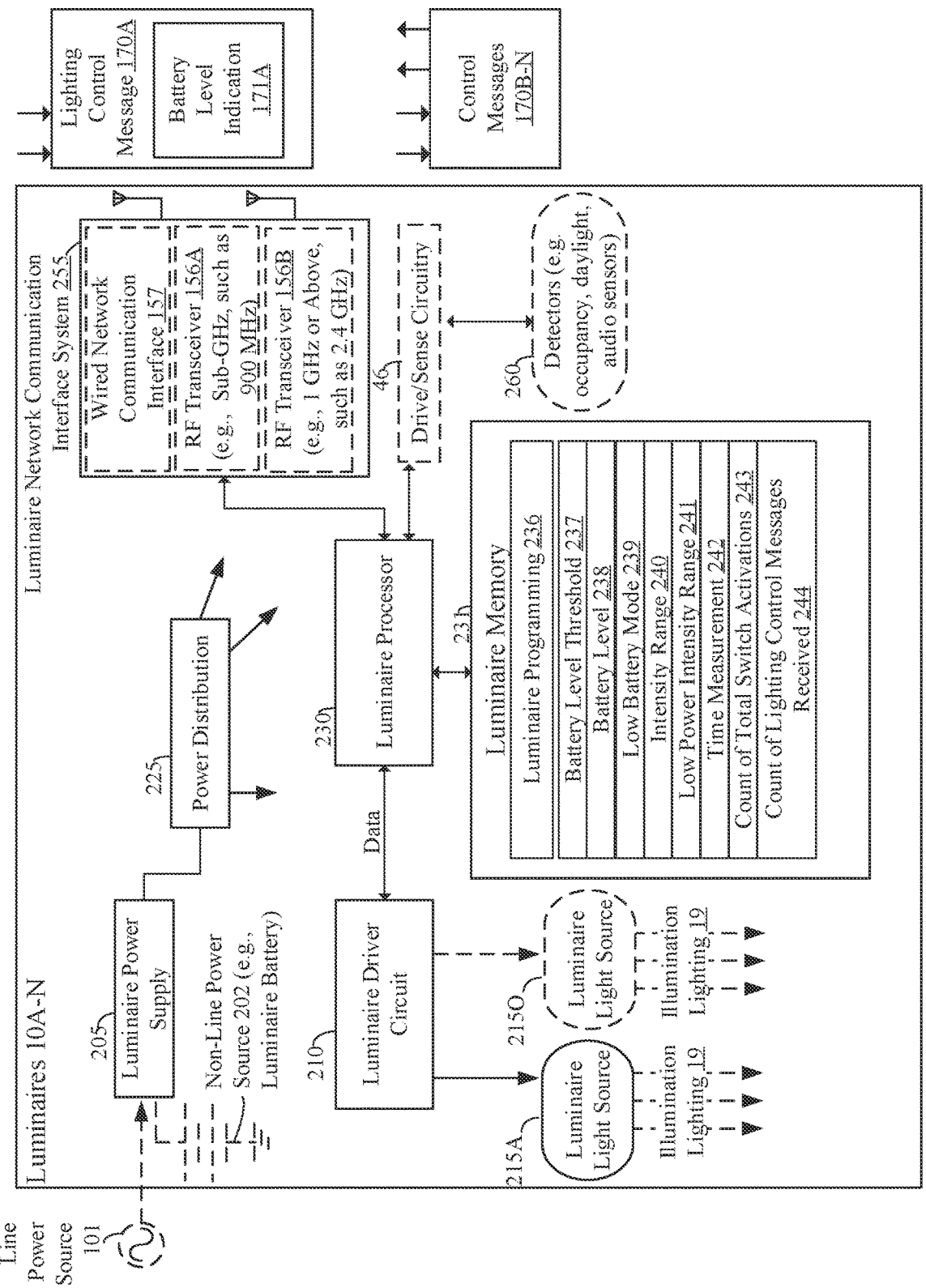
FIG. 2 is a block diagram of a luminaire that is in the lighting control group that communicates via the lighting control system of FIG. 1.

As shown, each of the luminaires 10A-N include an on-board luminaire processor 230, which is shown in more detail in FIG. 2. The luminaire processor 230 is connected to a luminaire memory 231 (volatile and non-volatile). As shown, the luminaire processor 230 of the luminaires 10A-N is coupled to a luminaire driver circuit 210 that controls light source operation of a light source 215A-N. Occupancy devices 45A-C have an occupancy processor 430 coupled to drive/sense circuitry 46 operable to control detectors 47 (e.g., occupancy sensor circuit 461). The control station 20 has a control station processor 830 that includes a sense circuit 46 operable to control switches 561.

Luminaires 10A-N and the control group 8 can communicate control signal(s) 170A-N for the luminaire light sources 215A-0 over a wireless lighting control network 5 (e.g., 900 MHz) and accordingly can each include a first radio 156A in the sub-GHz range. A variety of control signals 170A-N for the luminaire light sources 215A-0 are transmitted over wireless lighting control network 5, including, for example, to turn the luminaire light source 215A on/off and sensor trip events. In a first example, each luminaire 10A-N and control group 8 member is also equipped with a second above 1 GHz radio 156B (e.g., near range 2.4 GHz Bluetooth Low Energy (BLE)) that communicates over a separate commissioning network (not shown) for purposes of commissioning and maintenance of the lighting control system 1, however no control signals 170A-N for the illumination lighting 19 pass over this commissioning network. In a second example, wireless lighting control network 5 and commissioning network are combined, such that both control signals 170A-N for luminaire light sources 215A-0 and commissioning/maintenance information pass over the above 1 GHz range wireless communication band. In the second example, luminaires 10A-N and the control group 8 are only equipped with the above 1 GHz radio 156B for communication of control signals 170A-N and for luminaire light source 215A-0 and commissioning/maintenance information.

Control signals 170A-N can also communicate status information between luminaires 10A-N and the control group 8, such as whether a luminaire 10A is emitting light, or the battery level of a battery connected to a luminaire 10A-N or control device 8. Control signals 170A-N can also include dedicated messages which communicate merely by the presence or absence of those dedicated messages: heartbeat messages 170G, the receipt of which indicate that a sending device is capable of sending messages, are a type of dedicated message, and are therefore a type of control signal 170A-N. Heartbeat messages 170G, along with other control signals 170A-F, H-N, can be a very simple broadcast or unicast packet with no content except a source address and a destination address. The heartbeat messages and other control signals 170A-N can also include other information, which may be relevant to the low battery mode 239, such as the current battery level 238, heartbeat period or heartbeat periodicity threshold 841, a count of heartbeat messages 170G, ambient temperature value 839, etc.

Alternatively, the lighting control network 5 may be partially or completely wired, and the luminaires 10A-N and the control group 8 communicate over wired data connections. Furthermore, some control signals 170A-N can be communicated over energy-providing wired connections, for example in the presence or absence of voltage or current, or in the timing of the presence or absence of voltage or current. The wired connections do not necessarily provide energy, in particular in implementations where a power switch 15A has a wired connection, and is powered by the switch battery 302.

The lighting control system 1 can be provisioned with a mobile device that includes a commissioning/maintenance application for commissioning and maintenance functions of the lighting control system 1. For example, a mobile device enables mobile commissioning, configuration, and maintenance functions and can be a PDA or smartphone type of device with human interfacing mechanisms sufficient to perform clear and uncluttered user directed operations. A mobile device runs mobile type applications on iOS, Android, or Windows 11 operating systems and commissioning/maintenance application to support commissioning. Commissioning can include setting the effect of the low battery mode 239, particularly setting the desired functional and performance changes made to the luminaires 10A-N and the control group 8. The effect of the low battery mode 239 could also be fixed as a factory-programmed feature, or can be presented in a user-programmable configuration so that the lighting control system 1, via a control station 20 or other interface device, behavior can be optimized for the specific physical space 2 and owner requirements of the lighting control system 1.

The user-programmable configuration may include the capability to configure whether: the luminaire light sources 215A-0 turn on to produce full illumination lighting 19 immediately; the luminaire light sources 215A-0 turn on to a dim level of illumination lighting 19 immediately, and then whether the luminaires 10A-N raise the luminaire light sources 215A-0 to a higher level of illumination lighting 19 later; the luminaires 10A-N delay for a specific period of time before turning on the luminaire light sources 215A-0; or the luminaires 10A-N wait until a specific time of day before turning on the luminaire light sources 215A-0 when the battery level 238 (see FIG. 2) of one or more power switches 15A-C is less than the battery level threshold 237 (see FIG. 2). The user-programmable configuration my also include options such as to enable a visual or aural indicator, like the indicator 962 (See FIG. 9), when the battery level 238 is below a certain threshold, like the battery level threshold 237. This ability to set user-programmable configurations can be specifically useful when the battery level 237 is sent to the luminaires 10A-N independent of a control message 170A-N, or when the battery level 237 is derived from indirect data sources, such as heuristic, time, or usage-based information.

The lighting control system 1 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting control system 1 includes a communications backbone and includes model—transport, network, media access control (MAC)/physical layer (PHY) functions. The sub-GHz communications of the wireless lighting control network 5 features are built on a near 802.15.4 MAC and PHY implantation with network and transport features architected for special purpose control and air time optimizations to limit chatter.

The lighting control system 1 can further include a gateway 70. The gateway 70 is a computing device that provides access between a wide area network (WAN) 55 and a local communication network, such as the lighting control network 5. The WAN 55 (e.g., Internet) can be a cellular network, optical fiber, cable network, or satellite network that can be connected to via Ethernet, for example. The gateway 70 may provide routing, access, and other services for the luminaires 10A-N and the control group 8 members residing at the physical space 2, for example.

The lighting control system 1 can still further include a cloud computing device 65, and the cloud computing device 65 resides off-premises 60 (e.g., cloud) meaning the cloud computing device 65 is a remote computing device or server hosted on the Internet to store, manage, and process data, rather than the local gateway 70. The gateway 70, cloud computing device 65, or mobile device can also be used to monitor and control (e.g., switch on/off) the luminaire light sources 215A-0 of the luminaires 10A-N and other components of the lighting control system 1, such as control group 8 members. Gateway 70, cloud computing device 65, and mobile device can receive and process data from the luminaires 10A-N and the control group 8 members.

Lighting control system 1 can be deployed in standalone or integrated environments. Lighting control system 1 can be an integrated deployment, or a deployment of standalone groups with no gateway 70. Lighting control system 1 may comprise a mix and match of various indoor systems, wired lighting systems (nLight® wired), wireless lighting systems (nLight® AIR), emergency, and outdoor (Dark to Light®) products that are networked together to form a collaborative and unified lighting solution. Additional control devices and lighting fixtures, gateway(s) 70 for backhaul connection, time sync control, data collection and management capabilities, and interoperation with the Acuity Brands Lighting's commercially available SensorView™ product may also be provided.

The instructions, programming, or application(s) implementing the distributed control programming described herein may be software or firmware used to implement any other device functions associated with luminaires 10A-N, control group 8 members, network controller (e.g., gateway 70), and cloud computing device 65. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 231, 331, 431, 531, 631; and/or another computer used to download or otherwise install such programming into the with luminaires 10A N, control group 8 members, network controller (e.g., gateway 70), cloud computing device 65, or a transportable storage device or a communications medium for carrying program for installation in the luminaires 10A-N, control group 8 members, network controller (e.g., gateway 70), and/or cloud computing device 65.

FIG. 2 is a block diagram of a luminaire 10A of the lighting control system 1. As shown, the luminaire 10A includes a luminaire light source 215A to emit illumination lighting 19, to improve visibility for occupants of the physical space 2. The luminaire 10A may have additional luminaire light sources 2150, which can be operated independently from each other: For example, the luminaire light source 215A can be one while the luminaire light source 2150 is off, or the luminaire light source 215A can be set to 50% intensity while the luminaire light source 2150 is set to 100% intensity.

Luminaire 10A includes a luminaire power supply 205 that is driven by a line power source 101 and optionally/or a non-line power source 202. The luminaire power supply 205 may include a magnetic transformer, electronic transformer, switching converter, rectifier, or any other similar type of circuit to convert an input power signal into a power signal suitable for a luminaire light sources 215A-0. Luminaire 10A includes power distribution circuitry 225 driven by the line power source 101 or non-line power source 202. The power distribution circuitry 225 distributes power and ground voltages to the luminaire processor 230; luminaire memory 231; luminaire network communication interface system 255 (e.g., wireless transceivers, wired interface); and optional on-board occupancy, motion, ozone, daylight, or audio sensor as detectors 260 to provide reliable operation of the various circuitry on the luminaire 10. The optional detectors 260 function similarly to the occupancy devices 45A-B, and the occupancy devices 45A-B can be co-located within the luminaire 10A, and utilize the physical components of the luminaire 10A. Luminaire processor 230 includes a central processing unit (CPU) that controls the light source operation of the luminaire light sources 215A-0. Luminaire memory 231 can include volatile and/or non-volatile storage.

The luminaire light sources 215A-0 are configured to emit illumination lighting 19 in the vicinity of the physical space 2. The physical space 2 can include an office, hospital, medical facility, classroom, restaurant, retail store, restroom, and other private or public facilities. However, the light source 215A-0 may also emit non-visible light, such as ultraviolet light.

Luminaire 10 further includes a luminaire driver circuit 210 coupled to control the luminaire light sources 215A-0. Luminaire driver circuit 210 can include an electrical circuit that pulses a high voltage to ignite or strike an arc of the luminaire light sources 215A-O, after which the discharge of the luminaire light sources 215A-0 can be maintained at a lower voltage.

The luminaire light sources 215A-0 may include electrical-to-optical transducers, such as various light emitters. The emitted illumination lighting 19 may be in the visible spectrum, or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, nanoscale LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. A luminaire 10A that includes a laser diode as luminaire light source 215A-0 can include a light frequency up-converter.

A lamp or "light bulb" is an example of a single light source. An LED light engine may use a single output for a single source but typically combines light from multiple LED type emitters within the single light engine. The luminaire light sources 215A-0 can include light emitting diodes (LEDs) that emit red, green, and blue (RGB) light or tunable white light to emit the illumination lighting 19. Many types of light sources provide uniform light output, although there may be some intensity striations. For purposes of the present examples, however, the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture. The individual emitters or groups of emitters may be separately controllable, for example to control intensity of the source output.

Luminaire driver circuit 210 can drive the luminaire light sources 215A-0 by regulating the power to the luminaire light sources 215A-0 by providing a constant quantity or power to the luminaire light sources 215A-0 as their electrical properties change with temperature, for example. The luminaire driver circuit 210 provides power to the luminaire light sources 215A-O. The driver circuit 210 may include a ballast and an igniter for an arc gaslamp type of luminaire light source 215A-O. Alternatively or additionally, luminaire driver circuit 210 can include a constant-voltage driver, constant-current driver, or AC LED driver type circuit that provides dimming through a pulse width modulation (PWM) circuit and may have many channels for separate control of different LEDs or LED arrays that comprise the luminaire light sources 215A-O. An example of a commercially available luminaire driver circuit 210 is manufactured by EldoLED®. In the case of luminaire 10A, the luminaire driver circuit 210 is coupled to the luminaire light sources 215A-0 to control light source operation of the luminaire light sources 215A-O. In particular, the luminaire 10A can include a luminaire optical wireless communication interface to transmit data over a VLC communication band. A VLC communication band is a data communications network variant, which uses visible light between 400 and 800 THz (780-375 nm), and is a subset of optical wireless communications technologies. VLC can be done by having the luminaire 10A output oscillating visible light or illumination lighting 19 (e.g., projection of a barcode) in combination with the luminaire light sources 215A-O. A common method of VLC modulation or oscillation is to rapidly vary luminaire 10 brightness too quickly for a human eye to detect.

Luminaire driver circuit 210 can further include an AC or DC current source or voltage source, a regulator, an amplifier (such as a linear amplifier or switching amplifier), a buck, boost, or buck/boost converter, or any other similar type of circuit or component. Luminaire driver circuit 210 may output a variable voltage or current to the luminaire light sources 215A-O that may include a DC offset, such that its average value is nonzero, and/or an AC voltage.

In order to proportionally reduce a physical size of a rectifier (AC-DC converter), e.g., included in the luminaire power supply 205 or the luminaire driver circuit 210, relative to the total size of the luminaire 10A, the luminaire 10A can include a plurality of luminaire light sources 215A-) (e.g., two, three, four, or more).

As shown, luminaire processor 230 is coupled to a luminaire communication interface system 255 for receiving and transmitting various control signals 170A-N. Luminaire communication interface system 255 of FIG. 2, power switch communication interface 355 of FIG. 3, occupancy device communication interface system 455 of FIG. 4, control station communication interface system 555 of FIG. 5, gateway communication interface 655 of FIG. 6, and line control communication interface system 1055 of FIG. 10 allow for data communication (e.g., wired or wireless) over various networks, including the lighting control network 5 of FIG. 1. Communication interface systems 255, 355, 455, 555, 655, 1055 include at least one radio frequency (RF) transceiver (XCVR), for example, a single-band, dual-band, or tri-band chipset of RF transceiver(s) 156A-B configured for wireless communication via separate radios that operate at three different frequencies, such as sub-GHz (e.g., 900 MHz), Bluetooth Low Energy (BLE) (2.4 GHz), and 5 GHz, for example. For example, luminaire communication interface system 255 of luminaire 10A includes a first luminaire RF transceiver 156A configured for wireless communication (e.g., unicast and multicast) via a wireless lighting control network 5 over a first wireless lighting control network communication band (e.g., sub-GHz) for lighting control and systems operations (or information), such as control signals 170A-N, with member devices of the lighting control group 8. Luminaire communication interface system 255 can include a second luminaire wireless RF transceiver 156B for communication (e.g., point-to-point) via a commissioning network (not shown) with the control group 8 member (e.g., mobile device) over a second different wireless commissioning network communication band, such as 1 GHz or above communications (e.g., 2.4 GHz for Bluetooth) for commissioning, configuration, or maintenance operations. Luminaire 10A can communicate over an optional secondary network (e.g., wired or wireless LAN) via the second luminaire wireless RF transceiver 156B, such as a backhaul network for communication between the luminaires 10A-N, control group 8 members, and a network controller (e.g., gateway) 70. Transport layer methods ride on the network layer function of the RF transceivers 156A-B. The second luminaire RF transceiver 156B is optional. As further shown, luminaire communication interface system 255 can include an optional wired network communication interface 157 for communication over a wired lighting control network 5.

Figure 3:
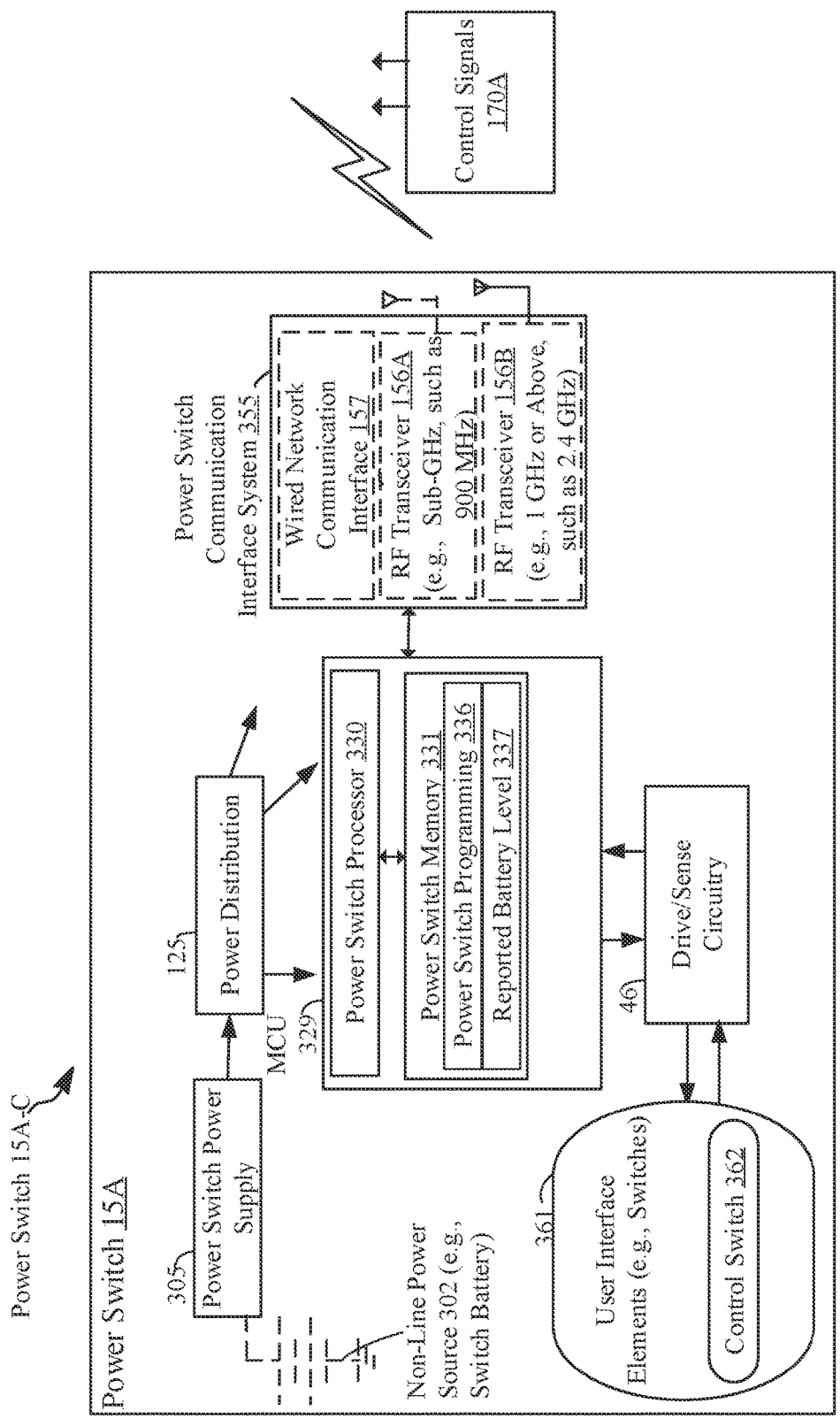
FIG. 3 is a block diagram of a power switch of the lighting control group that communicates via the lighting control system of FIG. 1.
Figure 4:
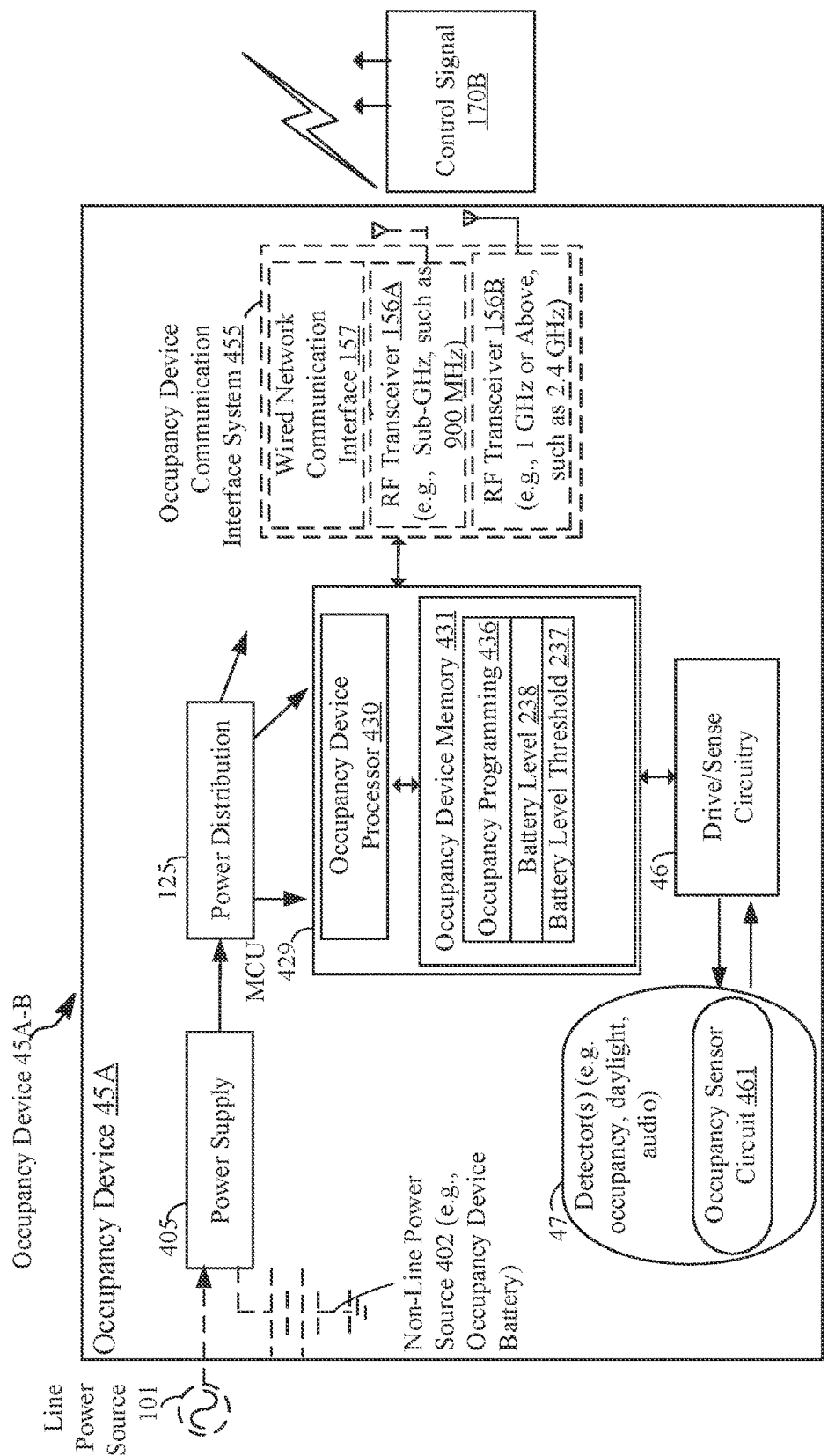
FIG. 4 is a block diagram of an occupancy device of the lighting control group that communicate via the lighting control system of FIG. 1.
Figure 5:
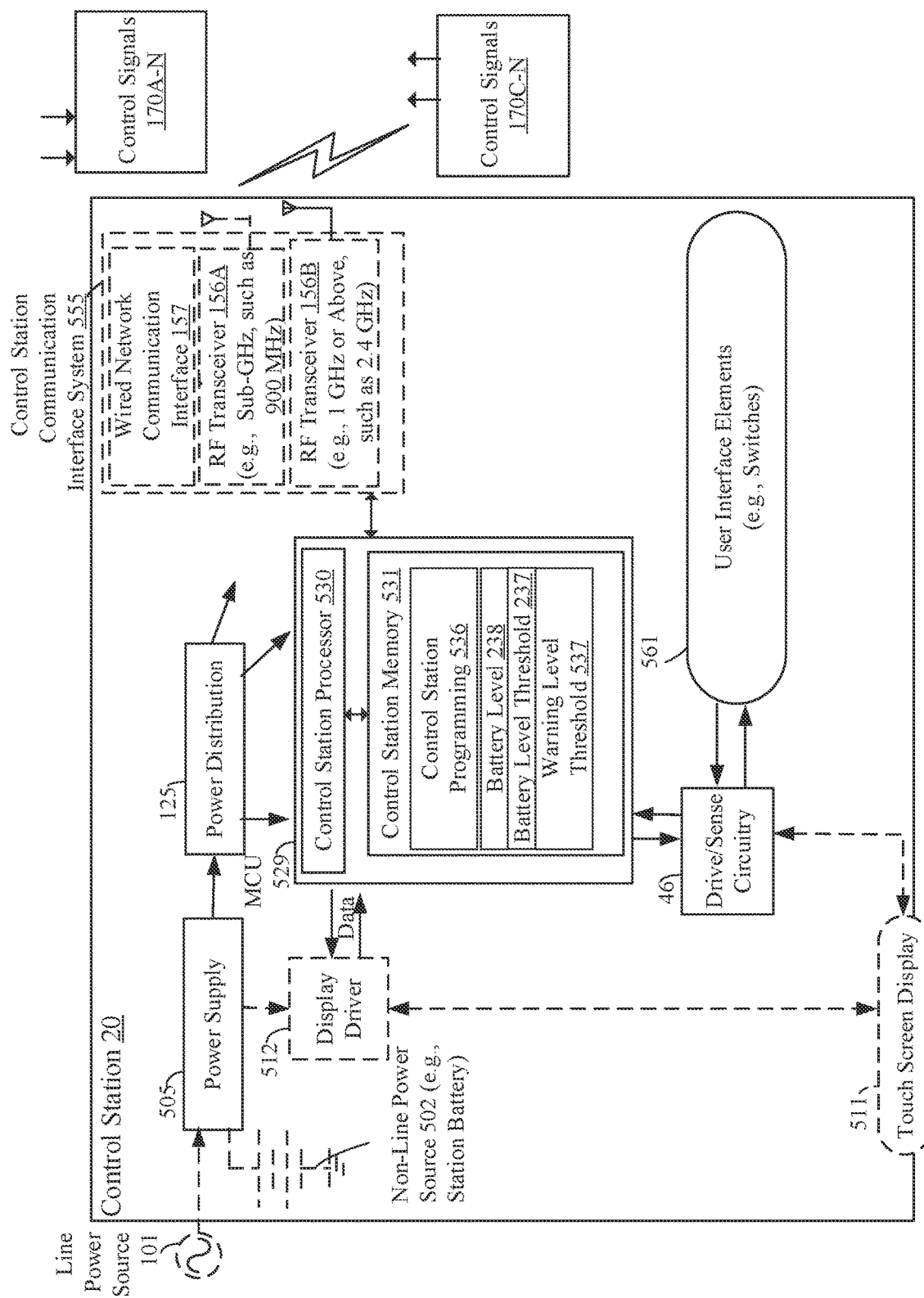
FIG. 5 is a block diagram of a control station of the lighting control group that communicate via the lighting control system of FIG. 1.
Figure 6:
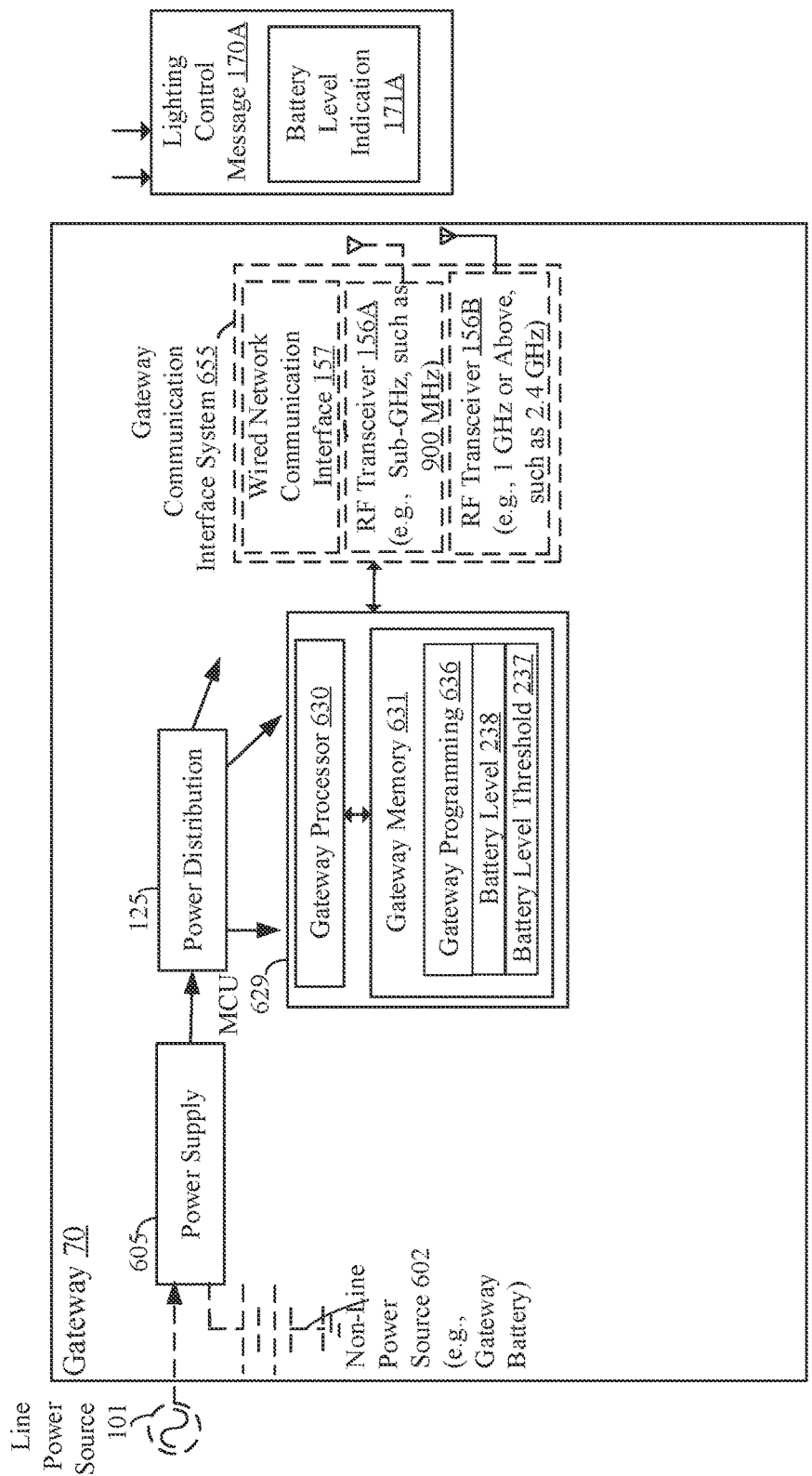
FIG. 6 is a block diagram of a gateway of the lighting control group that communicate via the lighting control system of FIG. 1.
Figure 10:
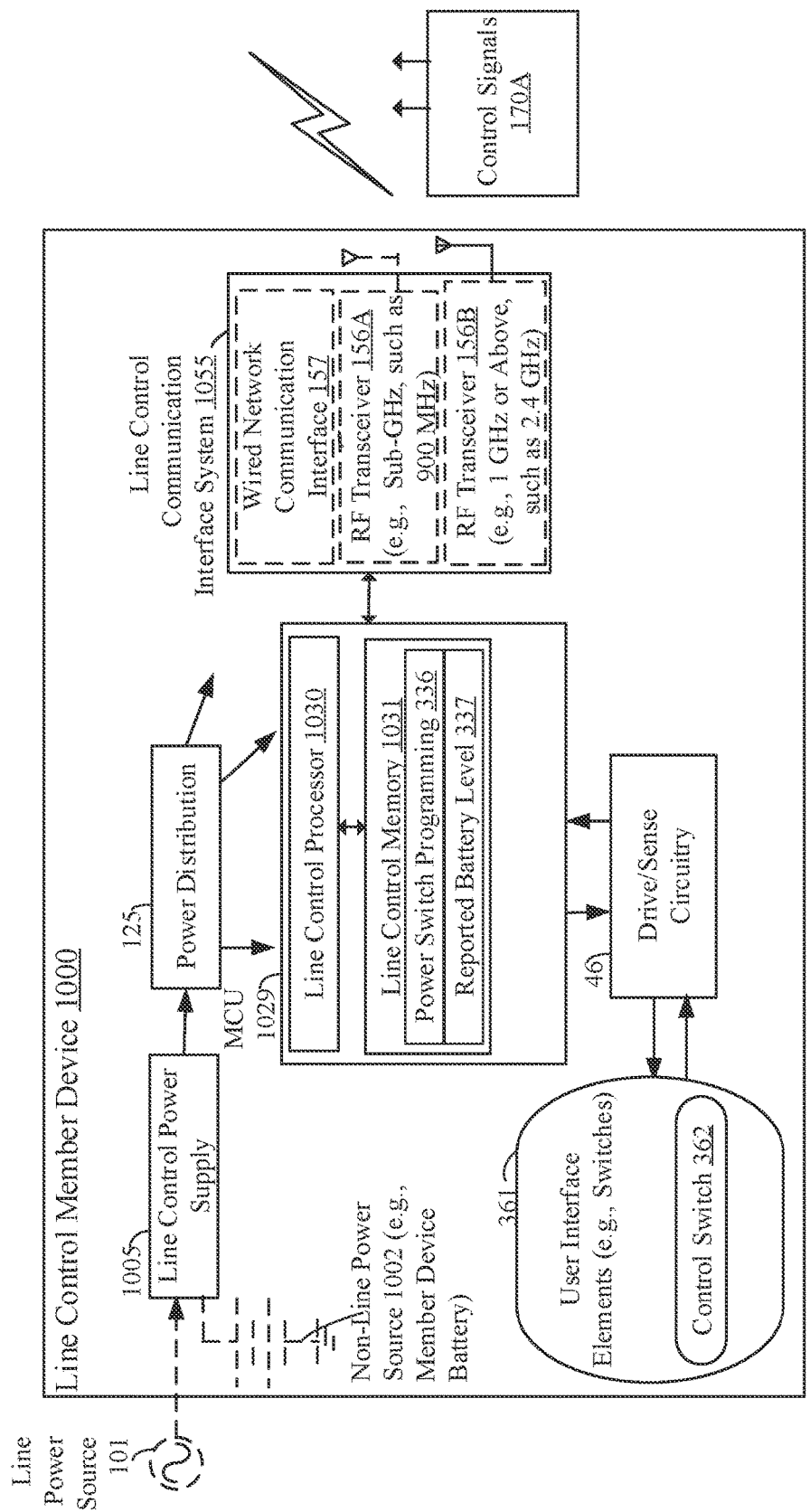
FIG. 10 is a block diagram of a line control member device of the lighting control group that communicate via the lighting control system of FIG. 1.

Luminaire processor 230, power switch processor 330 of FIG. 3, occupancy device processor 430 of FIG. 4, control station processor 530 of FIG. 5, gateway processor 630 of FIG. 6, and line control processor 1030 of FIG. 10 serve to perform various operations, for example, in accordance with instructions or programming executable by processors 230, 330, 430, 530, 630, 1030. For example, such operations may include operations related to communications with various lighting control system 1 elements, such as luminaires 10A-N and control group 8 members during to implement the low battery luminaire activation protocol 700. Although a processor 230, 330, 430, 530, 630, 1030 may be configured by use of hardwired logic, typical processors are general processing circuits configured by execution of programming. Processors 230, 330, 430, 530, 630, 1030 include elements structured and arranged to perform one or more processing functions, typically various data processing functions. Although discrete logic components could be used, the examples utilize components forming a programmable CPU. A processor 230, 330, 430, 530, 630, 1030 for example includes one or more integrated circuit (IC) chips incorporating the electronic elements to perform the functions of the CPU. The processors 230, 330, 430, 530, 630, 1030 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in. Although the illustrated examples of the processors 230, 330, 430, 530, 630, 1030 include only one microprocessor, for convenience, a multi-processor architecture can also be used. A digital signal processor (DSP) or field-programmable gate array (FPGA) could be suitable replacements for the processors 230, 330, 430, 530, 630, 1030 but may consume more power with added complexity.

Luminaire memory 231, power switch memory 331 of FIG. 3, occupancy device memory 431 of FIG. 4, control device memory 531 of FIG. 5, gateway memory 631 of FIG. 6, and line control memory 1031 of FIG. 10 are for storing data and programming. In the example, the main memory system 231, 331, 431, 531, 631, 1031 may include a flash memory (non-volatile or persistent storage) and/or a random-access memory (RAM) (volatile storage). The RAM serves as short term storage for instructions and data being handled by the processors 230, 330, 430, 530, 630, 1030 e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

Therefore, FIGS. 1 and 2 depict a luminaire 10A including a luminaire network communication interface system 255 including at least one transceiver 156A-B configured for communication via a lighting control network 5 over a lighting control network communication channel for lighting control and systems operations. A luminaire light source 215A to emit illumination lighting 19. A luminaire driver circuit 210 coupled to the luminaire light source 215A to control light source operation of the luminaire light source 215A. A luminaire power supply 205. A luminaire processor 230 coupled to the luminaire network communication interface system 255 and the luminaire driver circuit 210. A luminaire memory accessible 231 to the luminaire processor 230 and including a battery level threshold 237. The battery level threshold 237 is a calculated or pre-programmed amount the remaining power within the switch battery 302 of the power switch 15A can fall to and still operate consistently: once the switch battery 302 of the power switch 15A is depleted beyond the battery level threshold 237, the luminaire 10A can no longer rely on the power switch 15A to reliably transmit control signals 170A-N.

The luminaire 10A includes luminaire programming 236 in the luminaire memory 231, wherein execution of the luminaire programming 236 by the luminaire processor 230 configures the luminaire 10A to implement functions. First, to receive a lighting control message 170A. This lighting control message 170A will have instructions for controlling the luminaire light source 215A, and the luminaire 10A will likely execute these instructions. However, the lighting control message 170A will also contain a battery level indication 171A. The battery level indication 171A can be utilized by the luminaire 10A to determine the battery level of the sender power switch 15A. The battery level indication 171A can be explicit, and can take the form of a numerical percentage, or a pass/fail indication of a depleted switch battery 302. The battery level indication 171A can be discrete recorded data, such as the number of button presses experienced by the power switch 15A required to send the lighting control message 170A. The battery level indication 171A can be continuous recorded data, such as the amount of time since the switch battery 302 of the power switch 15A was replaced, recharged, or otherwise rejuvenated from the perspective of the power switch 15A. The battery level indication 171A can be innate heuristic information, such as the received signal strength indication (RSSI) value of the control message 170A itself. One of these forms of battery level indication 171A may be used as the sole method of communicating the battery level to the luminaire, combinations of these forms of battery level indication 171A may be used to communicate a combined battery level indication 171A, or two or more forms of battery level indication 171A may be coupled to provide additional algorithmic inputs to the luminaire 10A or to be used as diagnostic data for a technician.

Second, to determine a battery level 238 of a power switch 15A, using the battery level indication 171A data. Third, in response to the battery level 237 of the power switch 15A being less than the battery level threshold 237, to control the luminaire 10A to enter a low battery mode 239. The low battery mode 239 allows the luminaire 10A to operate in a predictable manner when the power switch 15A has a battery failure e.g., a low battery level. When the power switch 15A has a switch battery 302 at a low battery level, the power switch 15A is either incapable of sending control signals 170A-N, or sends control signals 170A-N inconsistently. Fourth, during the low battery mode 239, to control the luminaire light source 215A, via the luminaire driver circuit 210, to emit the illumination light 19.

Low battery mode 239 can include several different luminaire 10A and luminaire light source 215A behaviors, with the intent of providing safe and predictable luminaire light source 215A behavior when the power switch 15A is determined to be in a low battery mode 239. The luminaire light source 215A behaviors can include being turned on, dimmed, brightened, or having an adjustment to hue made. The luminaire 10A behaviors can also include limiting turning off, dimming, or adjusting the hue by the power switch 15A with a low battery level 238, or any or all of the power switches 15A-C, or any or all of the occupancy devices 45A-B. The luminaire 10A can notify other devices of the battery level 238, battery level threshold 237, or low battery mode 239 in the lighting control network 5, or off-site cloud computing device 65 via the gateway 70.

FIG. 3 is a block diagram of a power switch 15A of the lighting control system 1. The power switch 15A can be a toggle switch, button, keypad, or other interactable component. Power switch 15A includes a micro-control unit (MCU) 329, drive/sense circuitry 46, switches 361, and a power switch communication interface system 355. The switches 361 of the power switch at least include a control switch 362, which sends the lighting control signal 170A to the lighting control network 5 and in particular the luminaires 215A-N. Switches 361 can be an on/off switch, dimmer switch, etc. to control the luminaire light sources 215A-0 of the luminaires 10A-N. The power switch 15A can send on/off commands, or dimming commands, or other control commands to the luminaires 10A-N as control signals 170A-N. The example power switch 15A is a simple on/off switches, but the control switch 362 could by any kind of user interface element; the power switch 15A could also require a key, or a security challenge such as a passphrase, PIN, or fingerprint scan. The control switch 362 could also be implemented virtually, as a digital object an operator interacts with via a computing component like the touch screen display 511 of FIG. 5.

As shown, MCU 329 includes power switch processor 330 and power switch memory 331 to implement the low battery luminaire activation protocol 700 and the power switch programming 336 described herein. The circuitry, hardware, and software of the power switch 15A is similar to the luminaire 10A of FIG. 2, including the non-line power source 302, power switch power supply 305, power distribution 125, and the power switch communication interface system 355. In these examples, however, the power switch 15A does not have direct access to a line power source 101: the power switch is battery-operated 15A. However, a use case does exist for a power switch with a line power source 101 wherein the non-line power source 302 is a backup power source: in those examples, if the line power source 101 fails and the switch battery 302 is depleted, the lighting control system 1 performs the low battery luminaire activation protocol 700 to illuminate the physical space 2 with luminaires 10A-N utilizing backup power. The non-line power source 302 is a switch battery 302, which eventually will discharge and enter a depleted state. Without the low battery luminaire activation protocol 700, in the depleted state the power switch 15A will behave inconsistently, and not send control signals 170A in a reliable manner. Once the luminaire light sources 215A-0 have been activated by the low battery luminaire activation protocol 700, a technician can either recharge or replace the switch battery 302 in order to restore normal functionality to the power switch 15A. Alternatively, the switch battery 302 of the power switch 15A could be a rechargeable battery, capacitor, or the like which could be recharged automatically when line power is restored.

The power switch 15A can include a power switch communication interface system 355 like the luminaire communication interface system 255 of FIG. 2. The power switch 15A is configured to communicate with the luminaire 10A, as the power switch 15A does not utilize the same power source as the luminaire 10A and cannot transmit control signals 170A-N merely by current or voltage interruption to the luminaire power supply 205. However, the circuitry of the power switch 15A can be simple, potentially providing a binary switch value (on/off) via a network control signal 170A-N based upon whether control switch 362 (e.g. a toggle switch, button, etc.) of the room sensor 45 is activated.

The low battery luminaire activation protocol 700 is designed to be responsive to the power switch 15A behaving unreliably when the power switch has a depleted switch battery 302. Therefore, in some implementations the power switch 15A may not be designed to implement low battery luminaire activation protocol 700, and may only implement functions facilitating the low battery luminaire activation protocol 700 incidentally, e.g., providing the battery level 239 incidentally via the RSSI value of the lighting control message 170A: the power switch 15A does not need to be particularly configured to transmit the RSSI value, and it would be materially difficult to deliberately mask the RSSI value of the lighting control message 170A sent by the power switch 15A.

The power switch 15A is able to implement the low battery luminaire activation protocol 700, with itself or other members of the control group 8 as the subject. In particular, the power switch 15A can include a status light, which illuminates when the power switch 15A or a member of the control group 8 has a low battery level. The status light can illuminate in different colors depending upon whether the power switch 15A has a low battery level, another power switch 15B-C has a low battery level, or another member of the control group 8 has a low battery level. The power switch 15A can also deliberately not send lighting control messages 170A when the power switch 15A how a low battery level 238, and can illuminate or emit a sound when an occupant attempts to activate the control switch 362.

FIG. 4 is a block diagram of an occupancy device 45A of the lighting control system 1. The occupancy device 45A can be an occupancy, audio, light, motion, ozone, or daylight sensor. The occupancy device 45A can be a standalone device in the lighting control system 1 as shown in FIG. 1 or included (e.g., integrated) in the luminaire 10A as shown in FIG. 2. Occupancy device 45A includes a micro-control unit (MCU) 429, drive/sense circuitry 46, detector(s) 47 (e.g., occupancy, light, or audio) including an occupancy sensor circuit 461, and an optional occupancy device communication interface system 455. Detectors 47, including the occupancy sensor circuit 461, can be a sensor of occupancy (e.g., infrared sensor or image sensor, such as a camera, for occupancy or motion detection), a light sensor, an audio sensor, a temperature sensor, radar, or other environmental sensor. Drive/sense circuitry 46, such as application firmware, drives the occupancy, audio, and photo sensor hardware.

As shown, MCU 429 includes occupancy device processor 430 and occupancy device memory 431 to implement the low battery luminaire activation protocol 700 of the occupancy programming 436 described herein. The MCU 429 can comprise a microcontroller. The circuitry, hardware, and software of the occupancy device 45A is similar to the luminaire 10A of FIG. 2, including the line power source 101, non-line power source 402, occupancy device power supply 405, power distribution 125, and the occupancy communication interface system 455. If the occupancy device 45A is a standalone device, then the occupancy device 45A can include an occupancy device communication interface system 455 like the luminaire communication interface system 255 of FIG. 2. If the occupancy device 45A is integrated into the luminaire 10A like that shown in FIG. 2, then the occupancy device 45A may not include the occupancy device communication interface system 455. The circuitry of the occupancy device 45A can be extremely simple, potentially providing a binary switch value (on/off) via current or voltage interruption to the luminaire 10A based upon whether the detector 47 of the room sensor 45 is stimulated.

In an example where the occupancy device 45A is powered by a non-line power source 402 such as a battery, the luminaire 10A can perform the low battery luminaire activation protocol 700 with the occupancy device 45A as the subject, with minor modifications. Particularly, once the luminaire 10A determines the battery level of the occupancy sensor 45A is less than a battery level threshold for that occupancy sensor 45A, the luminaire 10A can enter a low battery mode 239, in which the luminaire 10A behaves as if the occupancy sensor 45A is constantly sensing occupants and causes luminaire light source 215A to turn ON and provide illumination lighting 19. However, if the control group 8 allows for the inactivation of the occupancy device 45A, then conversely the luminaire 10A may ignore the occupancy device 45A, as the occupancy device 45A can be disabled safely to prevent it from providing erratic occupancy information.

The behavior of the luminaire 10A and the lighting control system 1 is not limited to the disclosed options above when the battery level of the occupancy sensor 45A is less than a battery level threshold for that occupancy sensor 45A: the luminaire 10A can brighten, darken, ignore some or all lighting control messages 170A; the lighting control system 1 can reroute or redirect lighting control messages 170A intended for the luminaire 10A or any member device 6A-R, or can direct messages over the WAN 55 to alert remote devices.

FIG. 5 is a block diagram of a control station 20 device of the lighting control system 1. The circuitry, hardware, and software of the control station 20 shown are similar to the luminaire 10A of FIG. 2, including the control station communication interface system 555. As shown, the control station 20 includes an MCU 529 that includes a control station memory 530 and control station processor 531 to implement the low battery luminaire activation protocol 700 and the control station programming 536 described herein. The drive/sense circuitry 46 of the control station 20 responds to user interface elements (e.g., switches 561). Switches 561 can be an on/off switch, dimmer switch, etc. to control the luminaire light sources 10A-0 of the luminaires 10A-N. The control station 20 may further include a pilot light status indicator (not shown) to visually display the state of the various switches 361, 561.

In some examples, control station 20 includes a single shared button switch 861. When the switches 861 are implemented as a button station, the button station can include various button settings that can have the settings for the illumination light 19 emitted from the luminaire 10A-N adjusted, for example, four buttons can be arranged with two longitudinal buttons (north-south) and two lateral buttons (east-west).

Alternatively, instead of physical buttons or switches 561, the control station 20 may implement a touch screen display 511. The touch screen display 511 enables setting adjustments for the luminaire light sources 215A-0 of the luminaires 10A-N to be inputted via a user interface application (not shown) through manipulation or gestures on a touch screen display 511. For output purposes, the touch screen display 511 includes a display screen, such as a liquid crystal display (LCD) or light emitting diode (LED) screen or the like. For input purposes, the touch screen display 511 includes a plurality of touch sensors.

A keypad may be implemented in hardware as a physical keyboard of control station 20, and keys may correspond to hardware keys of such a keyboard. Alternatively, some or all of the keys (and keyboard) of control station 20 may be implemented as "soft keys" of a virtual keyboard graphically represented in an appropriate arrangement via touch screen display 511. The soft keys presented on the touch screen display 511 may allow the user of control station 20 to invoke the same user interface functions as with the physical hardware keys.

Drive/sense circuitry 46 is coupled to touch sensors of touch screen display 511 for detecting the occurrence and relative location/position of each touch with respect to a content display area of touch screen display 511. In this example, drive/sense circuitry 46 is configured to provide control station processor 530 with touch-position information based on user input received via touch sensors. In some implementations, control station processor 530 is configured to correlate the touch position information to specific content being displayed within the content display area on touch screen display 511. The touch-position information captured by the drive/sense circuitry 46 and provided to control station processor 530 may include, but is not limited to, coordinates identifying the location of each detected touch with respect to the display area of touch screen display 811 and a timestamp corresponding to each detected touch position.

In general, touch screen display 511 and its touch sensors (and one or more keys, if included) are used to provide a textual and graphical user interface for the control station 20. Touch screen display 511 also enables the user to interact directly with the viewable content provided in the content display area, typically by touching the surface of the screen with a finger or an implement such as a stylus.

An operator of a lighting control system 1 may only be aware of features and functionality that other similar products possess and the operator has experience with. For example, a lighting control system 1 provides functionality to turn the luminaires 10A-N on in a physical space 2, turn the luminaires 10A-N off, and possibly raise and lower the lighting level of the luminaires 10A-N. These operations can be performed by a user interface element, such as a labeled mechanical button, keypad, touch screen display 511, or a graphical user interface element, among others.

In an example where the control station 20 is powered by a non-line power source 502 such as a battery, the luminaire 10A can perform the low battery luminaire activation protocol 700 with the control station as the subject. Particularly, once the luminaire 10A determines the battery level of the control station 20 is less than a battery level threshold for that control station 20, the luminaire 10A can enter a low battery mode 239. Any device in the control group 8 may have the luminaire 10A perform the low battery luminaire activation protocol 700 with that device as the subject of the protocol, in furtherance of providing proper lighting when the battery 202, 302, 402, 502 of that subject device is depleted.

FIG. 6 is a block diagram of a gateway 70 of the lighting control system 1. Gateway 70 includes a micro-control unit (MCU) 629 and a gateway communication interface system 655. As shown, MCU 629 includes a gateway processor 630 and gateway memory 631 to implement the low battery luminaire activation protocol 700 and the gateway programming 636 described herein. The circuitry, hardware, and software of the gateway 70 is similar to the luminaire 10A of FIG. 2, including the line power source 101, non-line power source 602, power supply 605, power distribution 125, and the gateway communication interface system 655. The gateway 70 includes a gateway 70 communication interface system 655 like the luminaire communication interface system 255 of FIG. 2.

If the gateway 70 determines the battery level of the power switch 15A is less than a battery level threshold, the gateway 70 determines the luminaire is in a low battery mode 239, the gateway can send a control message 170C over the WAN 55 to remote devices, in order to alert remote technicians that the switch battery 302 of the power switch 15A requires assistance. Therefore, FIGS. 1-7 describe a lighting control system 1 including a lighting control group 8 including a plurality of member devices 6A-R, the member devices 6A-R including a power switch 15A and a luminaire 10A. The power switch 15A includes a power switch network communication interface system 355 including at least one transceiver 156A-B configured for communication via a lighting control network 5 over a lighting control network communication channel for lighting control and systems operations. A power switch power supply 305 driven by a non-line power source 302 e.g., a battery. A power switch processor 330 coupled to the power switch network communication interface system 355. A power switch memory 331 accessible to the power switch processor 330. Power switch programming 336 in the power switch memory 331, wherein execution of the power switch programming 336 by the power switch processor 330 configures the power switch 15A to implement functions. First, to transmit, via the lighting control network 5, a lighting control message 170A to the lighting control group 8.

The luminaire 10A includes a luminaire network communication interface system 255 including at least one transceiver 156A-B configured for communication via the lighting control network 5 over the lighting control network communication channel for lighting control and systems operations. A luminaire light source 215A to emit illumination lighting 19. A luminaire driver circuit 210 coupled to the luminaire light source 215A to control light source operation of the luminaire light source 215A. A luminaire power supply 205 driven by a power line 101. A luminaire processor 230 coupled to the luminaire network communication interface system 255 and the luminaire driver circuit 210. A luminaire memory 231 accessible to the luminaire processor 230 and including a battery level threshold 237. Luminaire programming 236 in the luminaire memory 231, wherein execution of the luminaire programming 236 by the luminaire processor 230 configures the luminaire 10A to implement functions. First, to receive the lighting control message 170A. Second, to determine a battery level 238 of the power switch 15A. Third, in response to the battery level 238 of the power switch 15A being less than the battery level threshold 237, control the luminaire 10A to enter a low battery mode 239.

In systems with multiple power switches 15A-C, a separate battery level 238, battery level threshold 237 can be maintained for each power switch 15A-C. Further, the behavior in low battery mode 239 can vary depending on which or how many of the power switches 15A-C have a switch battery 302 in a depleted state.

Further, execution of the luminaire programming 236 by the luminaire processor 230 configures the luminaire 10A to further implement functions. During the low battery mode 239, to control the luminaire light source 215A, via the luminaire driver circuit 210, to emit the illumination light 19. Additionally, during the low battery mode 239, the illumination lighting can have an intensity range 240 from 0% to 100%, associated with the range of illumination lighting 19 intensity the luminaire light source 215A can produce, with 100% as the maximum intensity illumination lighting 19 output, and 0% as the minimum or no intensity illumination lighting 19 output. Execution of the luminaire programming 236 by the luminaire processor 230 further configures the luminaire 10A to implement functions. To set an intensity of the light source 215A to any value within the intensity range 240. Furthermore, in some examples, during low battery mode 239, the intensity of the luminaire light source 215A is set to 100%. This behavior provides safe lighting in the physical space 2 when the behavior of the power switch 15A is compromised. In other examples, during low battery mode 239, the intensity of the luminaire light source 215A is limited to a value within a low power intensity range 241. The low power intensity range 241 is within a subset of the intensity range 240, e.g. between 40% and 100%. This behavior allows for safe lighting when the power switch 15A is inconsistently inoperable, while still allowing for some control when the power switch 15A is operable, or for control by other power switches 15B-C or the control station 20.

Further still, in some examples the lighting control message 170A includes a reported battery level 337 from the power switch 15A, which is a self-made assessment of the remaining charge left in the switch battery 302 of the power switch 15A, sent as the battery level indication 171A. In such examples, the function to determine a battery level 238 of the power switch 15A includes using the reported battery level included 337 with the lighting control message 170A.

In some examples, the lighting control system 1 includes an occupancy device 45A. The occupancy device 45A includes an occupancy communication interface system 455 including at least one transceiver 156A-B configured for communication via the lighting control network 5 over the lighting control network communication channel for lighting control and systems operations. An occupancy device processor 430 coupled to the occupancy network communication interface system 455. An occupancy sensor circuit 461 coupled to the occupancy device processor 430 to determine the presence or absence of occupants in a vicinity of the physical space 2. An occupancy device memory 431 accessible to the occupancy device processor 430. Occupancy programming 436 in the occupancy device memory 431, wherein execution of the occupancy programming 436 by the occupancy device processor 430 configures the occupancy device 45A to implement functions. In response to the battery level 238 of the power switch 215A being less than the battery level threshold 237: activate or deactivate the occupancy sensor circuit 461, modify a control pattern of the luminaire 10A, the control pattern informed by the occupancy device 45A, activate or deactivate functionality of the occupancy device 45A or a portion of the functionality of the occupancy device 45A, or a combination thereof. In some examples, the occupancy sensor circuit 461 can be activated and deactivated. When activated, the occupancy sensor circuit 461 determines the presence of occupants in a vicinity of the physical space 2, and then sends a control message 170B directing the luminaire 10A to provide illumination lighting 19. When deactivated, the occupancy sensor circuit 461 does not make a determination, and therefore does not send a control message 170B directing the luminaire 10A to provide illumination lighting 19. Therefore, activating the occupancy sensor circuit 461 does not transmit a control message 170B, but rather allows the occupancy device 45A to send the control message 170B if the occupancy sensor circuit 461 determines the presence of occupants in a vicinity of the physical space 2. A control pattern includes the behavior the luminaire 10A engages in or abstains from upon receiving control messages 170A-N from the occupancy device 45A. For example, when in low battery mode 239, the luminaire 10A may ignore control messages 170A-N from the occupancy device 45A indicating that the physical space 2 is unoccupied; or the luminaire 10A may accept such control messages 170A-N, but may not act upon those control messages 170A-N to turn on or turn off the light source 215A. Alternatively, the luminaire 10A may ignore or not act upon control messages 170A-N from the occupancy device 45A when not in low battery mode 239. The luminaire 10A may further change the illumination lighting 19 brightness, hue, or may flash the illumination lighting 19, when the occupancy device 45A detects occupancy of the physical space 2, but only when the luminaire 10A is in the low battery mode 239; otherwise, the luminaire 10A may simply turn on or off the light source 215A based on the occupancy of the physical space 2.

In some examples, the lighting control system 1 includes a control station 20, where the control station 20 includes a control station communication interface system 555 including at least one transceiver 156A-B configured for communication via the lighting control network 5 over the lighting control network communication channel for lighting control and systems operations. A control station processor 530 coupled to the control station network communication interface system 555. A control station memory 531 accessible to the control station processor 530. Control station programming 536 in the control station memory 531, wherein execution of the control station programming 536 by the control station processor 530 configures the control station 20 to implement functions. First, to receive the lighting control message 170A. Even if the lighting control message 170A is not directed to the control station 20, the control station 20 can still receive and assess the lighting control message 170A. Second, to determine the battery level 238 of the power switch 15A. In response to the battery level 238 of the power switch 15A being less than the battery level threshold 238, report a low battery level in a control signal 170C. In some implementations, it may be difficult for the individual member devices 6A-R of the lighting control group 8 to determine whether a power switch 15A has a low battery level. Therefore, utilizing all of the member devices 6A-R of the control group 8 (luminaries 10A-N, occupancy devices 45A-C, control station 20, other power switches 15B-C) to determine whether the power switch 15A is in a depleted state, allows for a more accurate and robust assessment across the lighting control system 1.

Additionally, in some examples execution of the control station programming 531 by the control station processor 530 further configures the control station 20 to implement functions. In response to the battery level of the power switch 15A being less than a warning level threshold 537 while still exceeding the battery level threshold 237, report a warning battery level. A warning battery level report indicates to technicians that the switch battery 302 of the power switch 15A, while working correctly and consistently for now, nevertheless requires the switch battery 302 to be recharged or replaced to ensure continued consistent performance. In some of these examples, the control station 20 is wall station, or a mobile device, and reports the low battery level or the warning battery level on an attached display or touch screen display 511. The screen display 511 or other interface of the control station 20 can also be configured in a user-programmable configuration, in order to allow for setting the desired functional and performance changes made to the luminaires 10A-N and the control group 8 to optimize the lighting control system 1 behavior for the specific physical space 2 and owner requirements of the lighting control system 1.

In certain examples, the lighting control system 1, further includes a gateway 70. The gateway 70 includes a gateway communication interface system 655 including at least one transceiver 156A-B configured for communication via the lighting control network 5 over the lighting control network communication channel for lighting control and systems operations, and at least one network interface 156A-B, 157 configured for communication via a wide area network (WAN). A gateway processor 630 coupled to the gateway network communication interface system 655. A gateway memory 631 accessible to the gateway processor 630. Gateway programming 636 in the gateway memory 631, wherein execution of the gateway programming 636 by the gateway processor 630 configures the gateway 70 to implement functions. First, to receive the lighting control message 170A. Second, to determine the battery level of the power switch 15A. Third, in response to the battery level 238 of the power switch 15A being less than the battery level threshold, transmit a low battery level message 170C via the WAN. The recipient of this low battery level message is an off-premises device, such as a cloud computing device 65. Once received, off-site technicians can plan to visit on-site to recharge or replace the switch batteries 302 in the power switches 15A-C.

Additionally, in some examples the lighting control system 1 includes a plurality of luminaire light sources 215A-0 including the luminaire light source 215A of the luminaire 10A, wherein the luminaire light sources 215A-0 of the plurality of luminaire light sources 215A-O dim in a signal pattern during the low battery mode 239. The dimming signal pattern indicates to a technician that the switch battery 302 of the power switch 15A needs to be recharged or replaced. The luminaire light sources 215A-N can each reside in a different luminaire 10A-N, or a single luminaire 10A can have multiple luminaire light sources 10A, O.

The lighting control messages 170A includes an RSSI value as the battery level indication 171A, and the function to determine the battery level 238 of the power switch 15A includes using the battery level indication 171A RSSI value to determine the battery level 238 of the power switch 15A. RSSI values can tend to weaken as the switch battery 302 of the power switch 15A becomes depleted.

The power switch 15A has a control switch 362, and the power switch 15A is configured to count a number of consecutive activations of the control switch 362. The function to determine the battery level 238 of the power switch 15A include using the number of consecutive activations of the control switch 362 sent within the lighting control message 170A as the battery level indication 171A. Multiple activations, or presses or toggles, of the control switch 362 indicates a user attempting to alter the behavior of the illumination lighting 19 by sending a lighting control message 170A. However, likely because the user did not perceive results, the user pressed the same command multiple times in rapid succession. The user not perceiving results from activating the control switch 362 indicates that the power switch 15A is unable to consistently send lighting control messages 170A, and requires multiple attempts to succeed. Requiring multiple messaging attempts to successfully send a lighting control message 170A is indicative of a depleted switch battery 302 connected to the power switch 15A. Therefore, multiple activations of the control switch 362 indicates that the switch battery 302 of the power switch 15A is depleted, and requires charging or replacement. Therefore, the luminaire 10A needs to enter low battery mode 239.

In some examples the lighting control system 1 includes a plurality of power switches 15A-C including the power switch 15A of the control group 8, The function to control the luminaire 10A to enter a low battery mode 239 can then further include that, in response to a respective battery level 238 of each power switch 15A-C in the plurality of power switches 15A-C being less than the battery level threshold 237, control the luminaire 10A to enter a low battery mode 239. This can be desirable in scenarios where only one power switch 15A is required to work: rather than entering the low battery mode 239 when a single power switch 15A is depleted, the control group 8 only enters a low battery mode 239 when all of the power switches 15A-C are depleted. This behavior can be configured to only enter low battery mode 239 when a subset of the power switches 15A-C are depleted, such as a majority of power switches 15A-B, or perhaps a power switch 15C by the entrance of the physical space 2: certain power switches 15C can be more important or more highly-trafficked than other power switches 15A-B.

In other examples, the luminaire 10A needs to track heuristic data to determine whether a power switch 15A has a depleted switch battery 302. Therefore, execution of the luminaire programming 236 by the luminaire processor 230 further configures the luminaire 10A to implement functions. First, to track: a time measurement 242, a count of total switch activations 243, a count of a number of the lighting control message received 244, or a combination thereof; since the switch battery power source 302 of the power switch 15A has been restored, replaced, recharged, or otherwise rejuvenated. Second, the function to determine the battery level 238 of the power switch 15A further includes using the time measurement 241, the count of total switch activations 242, the count of a number of the lighting control message received 244, or a combination thereof; to determine the battery level 238 of the power switch 15A. In scenarios where the power switch 15A tends to use the switch battery 302 at a consistent rate independent of use, tracking and using time since last charge as a time measurement 241 will provide a close analogue for the battery level 238 of the power switch 15A. In scenarios where the power switch 15 primarily uses power when the control switch 362 is pressed, or a lighting control message 170A is sent, then tracking and using times the control switch has been activated, or the number of messages the power switch 15A has sent since last charge will provide a close analogue for the battery level 238 of the power switch 15A. If time, button presses, and message sending all materially impact the life of the switch battery 302, then a combination of the time measurement 242, count of total switch activation 243, and count of lighting control messaged received 244 can be utilized to determine the battery level 238 of the power switch 15A.

Though the above description is focused on a luminaire 10A with luminaire programming 236, the functionality within the luminaire programming 236 and the stored objects 237-244 in luminaire memory 231 can be embodied in any device in the lighting control network 1, including control-oriented devices such as the control station 20, the gateway 70, or the cloud computing device 65. Further devices not depicted in the figures, such as relays, line and low voltage dimmers, DALI controllers, and DMX controllers may either fully implement the functionality within the luminaire programming 236 and the stored objects 237-244, or be used in combination with a control-oriented device to enter and exit a lower battery mode. For example, the control station 20 can determine that the reported battery level of the power switch 15A is less than the battery level threshold 237, and control the luminaire 10A to enter a low battery mode 239 directly via analog or digital control signals 170A-N; the control station 20 can control a luminaire 10A indirectly by sending control signals 170A-N to a device such as a relay, line or low voltage dimmer, DALI controller, DMX controller or similar which then controls the luminaire; and the control station 20 can control the control station 20 to enter a low battery mode; or control the occupancy device 45A to enter a low battery mode via analog or digital control signals 170A-N. Each device entering a low battery mode may behave in differing manners from one another. Devices beyond those described in the figures can also implement the functionality within the luminaire programming 236 and the stored objects 237-244, including dedicated devices which exist solely to monitor battery levels and battery level signals from the power switch 15A-C and place devices in the lighting control system 1 into a low battery mode via control signals 170A-N.

Figure 7:
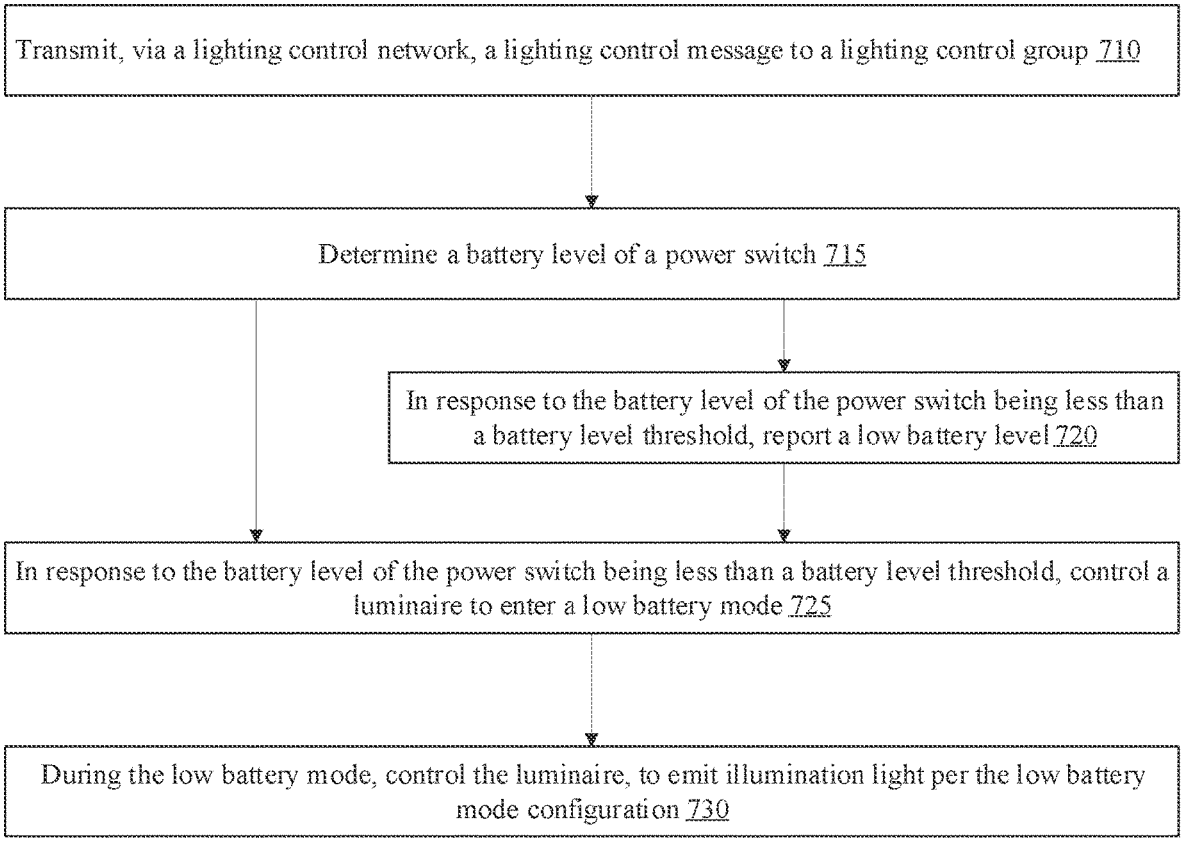
FIG. 7 depicts a low battery luminaire activation protocol for supporting luminaires when networked power switches enter a depleted battery state.

FIG. 7 depicts a low battery luminaire activation protocol 700 for supporting luminaires 10A-N when networked power switches 15A-C enter a depleted battery state. In step 710, a power switch 15A transmits, via the lighting control network 5, a lighting control message 170A to a lighting control group 8. Any of the members of the lighting control group 8, including but not limited to the luminaries 10A-N, occupancy devices 45A-C, control station 20, and other power switches 15B-C are able to act in step 715, while the recipient member device of the lighting control group 8 determines the battery level 238 of the power switch 15A. If the luminaire 10A determines that the battery level 238 of the power switch 15A is less than a battery level threshold 237, then step 725 occurs with the luminaire 10A controlling the luminaire 10A to enter the low battery mode 239. Alternatively, if another member of the control group 8, such as luminaire 10B, determines that the battery level 238 of the power switch 15A is less than a battery level threshold 237, then step 720 occurs with the determining device reporting a low battery level signal 170C, to the entire control group 8, and in particular to luminaire 10A. Then, using the low battery level signal 170C as the bases for determining the that the battery level 238 of the power switch 15A is less than a battery level threshold 237, step 725 occurs with the luminaire 10A controlling the luminaire 10A to enter the low battery mode 239. Once in low battery mode 239, during low battery mode 239, the luminaire 10A is controlled to emit illumination light 19 per the low battery mode configuration in step 730. The low battery mode configuration includes the various output settings of the luminaire 10A, such as lighting intensities, hues, and power levels, responsive to various input variables, such as the reported battery level 337, presses from the control switch 362, occupancy sensing from the occupancy sensor circuit 461, across multiple input devices—as well as responsive to the number of inputs from lighting control group 8 members, such as those forming a quorum of sensed occupancy, or a determination of a highest reported battery level 337.

In some implementations, the low battery luminaire activation protocol 700 may cause the luminaries 10A-N to enter the low battery mode 239 in response to different stimuli in the lighting control system 1 depicted in FIG. 1. For example, the luminaires 10A-N may enter the low battery mode 239 in response to a functional failure of occupancy devices 45A-C or the control station 20. Alternatively or additionally, the luminaires 10A-N may enter the low battery mode 239 in response to stimuli from a somewhat different system than that shown in FIG. 1, for example, other types of building systems besides a lighting system.

Figure 8:
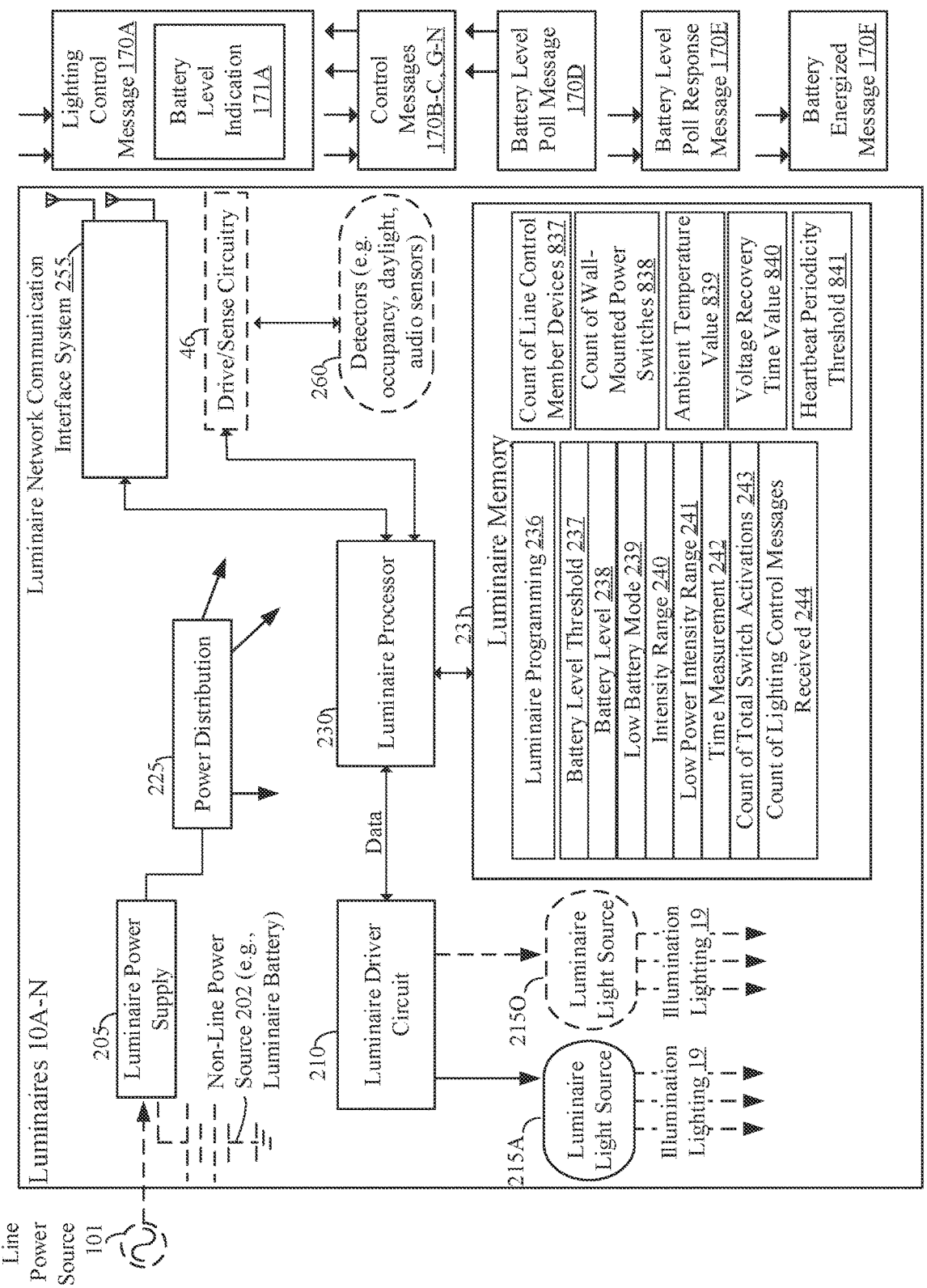
FIG. 8 is a block diagram of the luminaire of FIG. 2 depicting additional detail.

FIG. 8 is a block diagram of a luminaire 10A like that of FIG. 2 which implements additional methods and functions for discerning whether to enter low battery mode 239. Some elements and details of the luminaire 10A of FIG. 2 are omitted for clarity and readability but are nevertheless present or optionally presented respectively within the luminaire 10A of FIG. 8, as presented in FIG. 2.

The luminaire 10A can maintain in the luminaire memory 231 a count of line control member devices 837. A line control member device 1000 (see FIG. 10) is a member device 6A-R of the lighting control group 8 which functions substantially similarly to a power switch 15A. However, a line control member device 1000 has a line power source 101. Therefore while the line power source 101 is powered, the line control member device 1000 is not at risk of being unpowered, regardless of whether an optional non-line power source 1002 such as a member device battery is additionally powering the line control member device 1000. Depending upon the particular configuration, a control station 20 may qualify as a line control member device 1000.

By maintaining a count of line control member devices 837, the luminaire 10A implementing the luminaire programming 236 may optionally only enter a low battery mode 239 if all of the member devices 6A-R which send lighting control messages 170A to the luminaire 10A have a battery level 238 below the battery level threshold 237, and do not have an operating line power source 101. Effectively, if one of the member devices 6A-R is a line control member device 1000 with a working line power source 101, the luminaire 10A does not need to enter low battery mode 239 even if every member device 6A-R is in a low battery state, as the luminaire 10A may be controlled by a user interacting with the line control member device 1000 utilizing the line power source 101. The luminaire 10A may also implement some signaling behavior to indicate that one or more member device 6A-R are in a low battery state, but not ultimately change or impede the functionality of the luminaire light source 215A.

The luminaire 10A can also maintain in the luminaire memory 231 a count of wall-mounted power switches 838. A wall-mounted power switch is a power switch 15A which is mounted to a wall in the physical space 2 via a wall mount 950 (see FIG. 9). Depending upon the particular configuration, a control station 20 may qualify as a line control member device 1000.

By maintaining a count of wall-mounted power switches 838, the luminaire 10A implementing the luminaire programming 236 may optionally only enter a low battery mode 239 if all of the wall-mounted power switches 15A, line control member devices 1000, or control stations 20 have a battery level 238 below the battery level threshold 237, and do not have a working line power source 101. In some implementations, only wall-mounted control devices of the control group 8 are factored into the decision to enter low battery mode 239. Control devices, such as portable remotes or smartphones, with battery levels 238 below the battery level threshold 237 do not necessarily trigger the low battery mode 239.

The luminaire 10A can further maintain in the luminaire memory 231 an ambient temperature value 839 of a respective power switch 15A. The ambient temperature value 839 may be an instant value, or a historical value. The ambient temperature value 839 may also be maintained in the respective power switch 15A, to inform the reported battery level 337. The ambient temperature value 839 may be the general temperature of the power switch 15A, or a more specific temperature of the non-line power source 302 of the power switch 15A. Temperature can be a material factor in the performance of any battery, either in the charging and discharge rate for a given usage cycle, or over the lifetime of a battery. By tracking temperature, the lighting control system 1 can more accurately predict the rate of discharge of the non-line power source 302 of the power switch 15A, thereby being able to set a more effective battery level threshold 237 to allow for the recharging or replacement of the non-line power source 302 of the power switch 15A. Additionally, in power switches 15A-C with rechargeable non-line power sources 302, the temperature changes over time in the charging and discharging cycles can assist in determinations related to replacing or rejuvenating a battery non-line power source 302 in the power switch 15A.

Relatedly, the luminaire 10A can maintain in the luminaire memory 231, a voltage recovery time value 840 of the respective power switch 15A. The voltage recovery time value 840 may also be maintained in the respective power switch 15A. Voltage recovery time for a battery non-line power source 302 of the power switch 15A can depend upon the age of the battery. Batteries recover to a certain voltage over a certain period of time at a slower rate as the batteries age, and do not store the same total amount of energy as the batteries age. By tracking voltage recovery time as a voltage recovery time value 840, the change in voltage recovery time during the charging and discharging cycles of a battery non-line power source 302 can assist in determinations related to replacing or rejuvenating a battery non-line power source 302 in the power switch 15A.

The ambient temperature value 839, voltage recovery time value 840, and battery level 238, along with other performance values related to the power switch 15A, can inform a prediction model used by the luminaire 10A to determine how long until the non-line power source 302 in the power switch 15A becomes unreliable, and at what time the luminaire 10A should enter a low battery mode 239. Such a prediction model may vary depending on the type of power switch 15A, and even on the individual power switch 15A performance history.

The luminaire 10A can still further maintain in the luminaire memory 231 a heartbeat periodicity threshold 841. In some implementations, the power switch 15A sends control signals 170A-N, such as a heartbeat message 170G, with a certain cadence, frequency, or periodicity. By sending a control signal 170A-N on a regular schedule, the luminaire 10A can confirm that the power switch 15A is functioning once every period. If the power switch 15A misses one or more periods, and does not send a control signal 170A-N for those periods, the luminaire 10A can infer that the power switch 15A is not behaving as expected, and may have too little power remaining in the battery non-line power source 302 of the power switch 15A. However, missing one or more periods may also be indicative of another issue, such as a poor network connection on the part of either the luminaire 10A or the power switch 15A, and so the luminaire 10A may require multiple missed control signals 170A-N, either consecutively or within a set of periods, before determining that the power switch 15A is effectively in a low battery state, and that the luminaire 10A should enter a low battery mode 239. The heartbeat periodicity threshold 841 may also change depending upon the battery level 238 of the power switch 15A, with lower battery levels 238 preferably requiring more frequent lighting control messages 170A (and consequently a higher heartbeat periodicity threshold 841) to keep the luminaire 10A more accurately appraised of the battery level 238 of the power switch 15A.

The luminaire 10A can also conduct polling of the battery level of the power switch 15A. The luminaire 10A can send a battery level poll message 170D to the power switch 15A, requesting a battery level indication 171A. The power switch 15A then responds with a battery level poll response message 170E, which includes a battery level indication 171A like a lighting control message 170A. The rate of polling may vary based on the battery level 238 of the power switch 15A, network traffic of the lighting control system 1, the time of day at the physical space 2, or other factors.

Independently, the power switch 15A can also notify the luminaire 10A that the battery non-line power source 302 of the power switch 15A has been recharged or replaced, by sending a battery energized message 170F. The battery energized message 170F can affect the long-term performance data related to the power switch 15A, such as the ambient temperature value 839 or the voltage recovery time value 840. In some implementations, it may also inform the luminaire 10A that the power switch 15A will not be sending periodic lighting control messages 170A in line with the heartbeat periodicity threshold 841, until the battery level drops sufficiently at the power switch 15A.

Figure 9:
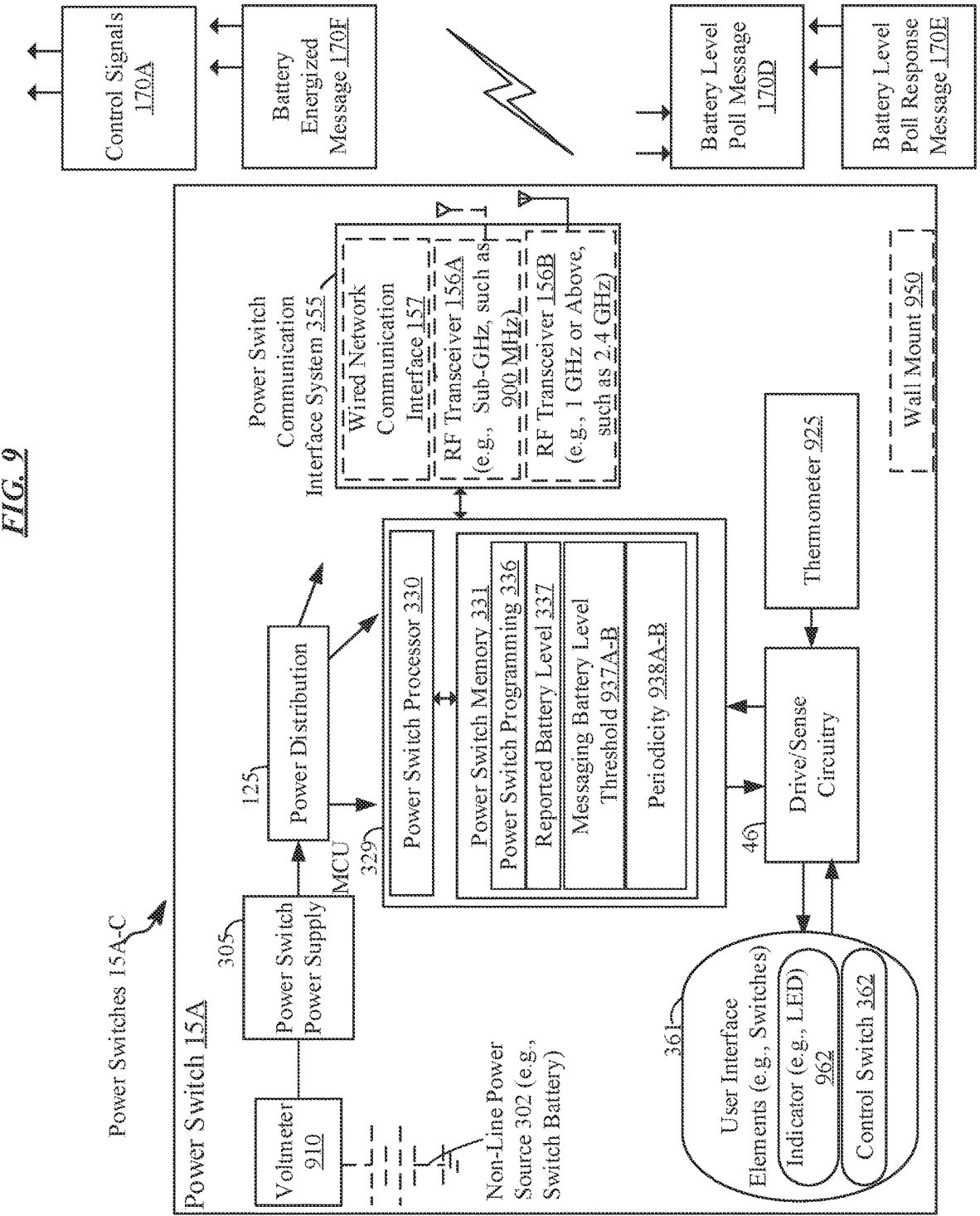
FIG. 9 is a block diagram of the power switch of FIG. 3 depicting additional detail.

FIG. 9 is a block diagram of a power switch 15A like that of FIG. 3 which implements additional methods and functions for discerning whether to enter low battery mode 239. Some elements and details of the power switch 15A of FIG. 3 are omitted for clarity and readability but are nevertheless present or optionally presented respectively within the power switch 15A of FIG. 9, as presented in FIG. 2.

The power switch 15A can include a voltmeter 910 for determining the voltage of the non-line battery source 302. The voltmeter 910 can be implemented within an analog-to-digital converter (ADC) of the MCU 329. The data from the voltmeter 910 informs the voltage recovery time value 840 stored in either the luminaire 10A or the power switch 15A. Power switch 15A can also include a thermometer 925 for determining the temperature of the power switch 15A, or of the non-line battery source 302 in particular. The data from the thermometer 910 informs the ambient temperature value 839 stored in either the luminaire 10A or the power switch 15A.

Power switch 15A can further include a wall mount 950 for affixing the power switch 15A to a wall in the physical space 2. In some implementations, only wall-mounted power switches 15A are configured to trigger the luminaire 10A to enter a low battery mode 239, as opposed to portable remote devices or smartphones.

Power switch 15A can additionally include an indicator 962, such as an LED, audio or aural alarm, an alert message or push notification to another device or software application, an icon on a touch screen display 511, or a combination thereof. The indicator 962 indicates to a user that the power switch 15A has a low reported battery level 337, and that the battery needs to be recharged or replaced. The indicator 962 may, through a separate or the same indication, indicate that the particular power switch 15A is responsible for the luminaire 10A entering the low battery mode 239, to help a user or technician isolate which power switch 15A requires the non-line power source 302 to be recharged or replaced.

Relatedly, the luminaire 10A can also include an indicator light, or a subset of lights, or alternative lights to indicate the low battery mode 239. The lights can vary their color intensity to indicate low battery mode 239. The occupancy devices 45A-B can also change functionality in a low battery mode 239: for example, the occupancy devices 45A-B may wait longer to determine the physical space 2 is unoccupied, may direct the luminaire 10A to dim rather than turn off the luminaire light source 215A if the physical space 2 is determined to be unoccupied, or may ignore instructions to keep the luminaire light source 215A off even if the physical space 2 is determined to be occupied. In another example, the luminaire 10A may be configured to only turn on or off the luminaire light source 215A in response to a command from a power switch 15A when power switch 15A is not in low battery mode 239. However, once the power switch 15A enters low battery mode 239 due to having a low battery, the occupancy devices 45A-B may activate, and direct the luminaire 10A to turn on the luminaire light source 215A when the physical space 2 is determined to be occupied, and then direct the luminaire 10A to turn off the luminaire light source 215A when the physical space 2 is determined to be unoccupied. Once the switch battery 302 of the power switch 15A is recharged or replaced, and the power switch 15A is no longer in low battery mode 239, the occupancy devices 45A-B can desist in directing the luminaire 10A to turn on or off the luminaire light source 215A when the physical space 2 is determined to be occupied or unoccupied—the occupancy devices 45A-B may even enter an inactive state, and stop determining the occupancy state of the physical space 2 until the power switch 15A enters low battery mode 239 again. Further, alarm devices within the control group 8 can be configured to alarm when low battery mode 239 is entered.

In the power switch memory 331, the power switch 15A can maintain a messaging battery level threshold 937A-B. In some implementations, the power switch 15A only begins sending the reported battery level 337 (or only begins sending the reported battery level 337 on a fixed schedule) to the luminaire 10A once the reported battery level 337 is below a certain threshold e.g., 25%. In those implementations, the power switch 15A will send the reported battery level 337 to the luminaire 10A once the reported battery level 337 is below the messaging battery level threshold 937A. The power switch 15A may behave differently at different messaging battery level thresholds 937A-B, such as sending the reported battery level 337 more often, or with more information, or with a higher RSSI at the intended recipient luminaire 10A. Therefore, the power switch 15A may maintain multiple messaging battery level thresholds 937A-B.

Relatedly, the power switch 15A can maintain a periodicity 938A-B in the power switch memory 331. The periodicity 938A is paired with the heartbeat periodicity threshold 841 within the luminaire 10A, enabling the power switch 15A to send lighting control messages 170A on a proper cadence to satisfy the luminaire 10A. The periodicity 938A may be quicker than the heartbeat periodicity threshold 841 to allow for error correction. The power switch 15A may transmit at different periodicities 938A-B at different messaging battery level threshold 937A-B. Therefore, the power switch 15A may maintain multiple periodicities 938A-B.

The non-line power source 302 of the power switch 15A may be a battery, or may be any kind of high-capacity capacitor. The non-line power source 302 can also be any kind of dynamic power source (such as a kinetic, solar, thermal, or energy harvesting from RF or other ambient energy sources) coupled with a battery or capacitor—such dynamic power sources may affect the prediction model of the luminaire 10A.

FIG. 10 is a block diagram of a line control member device 1000. The line control member device 1000 is substantially similar to the power switch 15A, and performs the same control functions in the lighting control system 1. However, the line control member device 1000 has a line power source 101, and may or may not have a non-line power source 1002.

Therefore, FIGS. 8-10, in conjunction with FIGS. 1-3, disclose a lighting control system 1 comprising a lighting control group 8 including a plurality of member devices 6A-R. The member devices 6A-R comprise a power switch 15A and a luminaire 10A. The power switch 15A includes a power switch network communication interface system 355 for network communications, a power switch power supply 305 driven by a non-line power source 302, a power switch processor 330 coupled to the power switch network communication interface system 355, and a power switch memory 331 accessible to the power switch processor 330. The power switch 15A further includes power switch programming 336 in the power switch memory 331. Execution of the power switch programming 336 by the power switch processor 330 causes the power switch 15A to transmit, via a lighting control network 5, a lighting control message 170A to the lighting control group 8.

Luminaire 10A includes a luminaire network communication interface system 255 for network communications, a luminaire light source 215A to emit lighting 19, a driver circuit 210 coupled to the luminaire light source 215A to control light source operation of the luminaire light source 215A, a luminaire processor 230 coupled to the luminaire network communication interface system 255, and a luminaire memory 231 accessible to the luminaire processor 230. The luminaire memory 231 includes a battery level threshold 237 and luminaire programming 236 in the luminaire memory 231. Execution of the luminaire programming 236 by the luminaire processor 230 causes the luminaire 10A to implement the following functions. First, the luminaire 10A receives the lighting control message 170A. Second, the luminaire 10A determines a battery level 238 of the power switch 15A. Third, in response to the battery level 238 of the power switch 15A being less than the battery level threshold 237, the luminaire 10A controls the luminaire 10A to enter a low battery mode 239.

Execution of the power switch programming 336 by the power switch processor 330 can further cause the power switch 15A to implement the following function. In response to stopping periodically transmitting the lighting control message 170A, the power switch 15A can transmit a battery energized message 170F. Execution of the luminaire programming 236 by the luminaire processor 230 can further cause the luminaire 10A to in response to receiving a battery energized message 170F, leave the low battery mode 239.

The power switch 15A can have a control switch 362. The power switch 15A can transmit, via the lighting control network 5, the lighting control message 170A to the lighting control group 8 in response to an activation of the control switch 362. In response to the power switch 15A transmitting the lighting control message 170A, each member device 6A-R of the plurality of member devices 6A-R including a line power source 101 can enter the low battery mode 239.

Execution of the luminaire programming 236 by the luminaire processor 230 can further causes the luminaire 10A to implement the following functions. First, in response to receiving the lighting control message 170A, the luminaire 10A determines a count of line control member devices 837 of the plurality of member devices 6A-R, each line control member device 1000 including a line control power supply 1005 driven by a line power source 101 and the power switch programming 336 in a line control memory 1031. Second, in response to the count of line control member devices 837 equaling zero and the battery level 238 of the power switch 15A being less than the battery level threshold 237, the luminaire 10A enters a low battery mode 239.

Execution of the luminaire programming 236 by the luminaire processor 230 can still further cause the luminaire 10A to implement the following functions. First, in response to receiving the lighting control message 170A, the luminaire 10A determines a count of wall-mounted power switches 838 of the plurality of member devices 6A-R. Each wall-mounted power switch 15A is configured to be affixed to a wall. In response to the count of wall-mounted power switches 838 equaling zero or the battery level 238 of the power switch being less than the battery level threshold 237, the luminaire 10A enters a low battery mode 239.

In some examples, determining the battery level 238 of the power switch 15A can include polling the power switch 15A. Hence, execution of the luminaire programming 236 by the luminaire processor 230 can further causes the luminaire 10A to implement the following functions. First, in response to the battery level 238 of the power switch being less than the battery level threshold 237, the luminaire 10A polls the power switch 15A for the battery level 238 of the power switch 15A. Determining the battery level 238 of the power switch 15A can include considering ambient temperature of the power switch 15A, or considering battery voltage recovery time of the power switch 15A.

FIGS. 8-10, in conjunction with FIGS. 1-3, also disclose a lighting control system 1 comprising a lighting control group 8 including a plurality of member devices 6A-R. The member devices 6A-R comprise a power switch 15A and a luminaire 10A. The power switch 15A includes a power switch network communication interface system 355 for network communications, a power switch power supply 305 driven by a non-line power source 302. The power switch 15A further includes a power switch processor 330 coupled to the power switch network communication interface system 355, a power switch memory 331 accessible to the power switch processor 330, and power switch programming 336 in the power switch memory 331. Execution of the power switch programming 336 by the power switch processor 330 causes the power switch 15A to implement the following functions. First, the power switch 15A periodically transmits, via a lighting control network 5, a heartbeat message 170G to the lighting control group 8.

Luminaire 10A includes a luminaire network communication interface system 255 for network communications, a luminaire light source 215A to emit lighting 19, a driver circuit 210 coupled to the luminaire light source 215A to control light source operation of the luminaire light source 215A, a luminaire processor 230 coupled to the luminaire network communication interface system 255. The luminaire 10A further includes a luminaire memory 231 accessible to the luminaire processor 230 and including a heartbeat periodicity threshold 841, and luminaire programming 236 in the luminaire memory 231. Execution of the luminaire programming 236 by the luminaire processor 230 causes the luminaire 10A to implement the following functions. First, the luminaire 10A receives the heartbeat message 170G. Second, the luminaire 10A determines a heartbeat periodicity of the power switch 15A based on a number of heartbeat messages 170G received in a period of time. Third, in response to the heartbeat periodicity of the power switch 15A being less than the heartbeat periodicity threshold 841, the luminaire 10A controls the luminaire 10A to enter a low battery mode 239.

Power switch memory 331 can include a messaging battery level threshold 937A. Execution of the power switch programming 336 by the power switch processor 330 further causes the power switch 15A to implement the following functions. First, the power switch 15A determines a battery level 238 of the power switch 15A. Second, in response to the battery level 238 of the power switch 15A being less than the messaging battery level threshold 937A, the power switch 15A periodically transmits, via the lighting control network 5, the heartbeat message 170G to the lighting control group 8.

Power switch 15A can further comprise an indicator 962. The indicator 962 can include a visual indicator such as an LED, an audible indicator such as a speaker or alarm, or both. Execution of the power switch programming 336 by the power switch processor 330 further causes the power switch 15A to implement the following functions. First, in response to the battery level 238 of the power switch 15A being less than the messaging battery level threshold 937A, the power switch 15A activates the indicator 962. Second, in response to the battery level 238 of the power switch 15A being greater than the messaging battery level threshold 937A, the power switch 15A stops periodically transmitting, via the lighting control network 5, the heartbeat message 170G to the lighting control group 8, and deactivates indicator 962. Third, in response to stopping periodically transmitting the heartbeat message 170G, the power switch 15A can transmit a battery energized message 170F. Execution of the luminaire programming 236 by the luminaire processor 230 can further cause the luminaire 10A to in response to receiving a battery energized message 170F, leave the low battery mode 239. The indicator 962 can be activated and deactivated independently of the functions contained in the power switch programming 336, based on a variety of criteria or user interactions.

Power switch memory 331 can include a first messaging battery level threshold 937A and a second messaging battery level threshold 937B. Execution of the power switch programming 336 by the power switch processor 330 further causes the power switch 15A to implement the following functions. First, the power switch 15A determines a battery level 238 of the power switch 15A. Second, in response to the battery level 238 of the power switch 15A being less than the first messaging battery level threshold 937A, the power switch 15A periodically transmits, via the lighting control network 5, the heartbeat message 170G to the lighting control group 8, at a first periodicity 938A. Second, in response to the battery level 238 of the power switch 15A being less than the second messaging battery level threshold 937B, the power switch 15A periodically transmits, via the lighting control network 5, the heartbeat message 170G to the lighting control group 8, at a second periodicity 938B. The second messaging battery level threshold 937B can be lower than the first messaging battery level threshold 937A, and the second periodicity 938B can be quicker than the first periodicity 938A.

Execution of the power switch programming 336 by the power switch processor 330 can further cause the power switch 15A to implement the following functions. First, the power switch 15A periodically transmit, via the lighting control network 5, the heartbeat message 170G to the lighting control group 8 until the non-line power source 302 enters a depleted state. Second, in response to a restoration, replacement, recharging, or other rejuvenation of the non-line power source 302 removing the non-line power source 302 from the depleted state, periodically transmit, via the lighting control network 5, the heartbeat message 170G to the lighting control group 8.

In the context of non-line power sources 202, 302, 402, 502, 602, 1002, "restoration", "replacement", "recharging", and "rejuvenation" can be understood as largely-synonymous words indicating an act causing the non-line power source 202, 302, 402, 502, 602, 1002 to enter a state capable of producing energy. The non-line power source 202, 302, 402, 502, 602, 1002 may have been in a depleted state prior to the act, and unable to produce energy; or the non-line power source 202, 302, 402, 502, 602, 1002 may have been capable producing energy, but at a reduced rate; or the non-line power source 202, 302, 402, 502, 602, 1002 may have been capable of producing energy at a nominal rate, and the act is a proactive one to avert the non-line power source 202, 302, 402, 502, 602, 1002 from producing a less-than-nominal rate of energy in the future.

Any of the steps or functionality of the low battery luminaire activation protocol 700, described herein for member devices 6A-R of the lighting control group 8 of the lighting control system 1 can be embodied in programming or one more applications as described previously. This includes, for example, luminaire programming 236, power monitor programming 336, occupancy programming 436, control station programming 536, and gateway programming 636. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++), procedural programming languages (e.g., C or assembly language), or firmware. In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a solid state read-write memory with NAND or NOR flash memory characteristics, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The behavior of member devices 6A-R described is by way of example: any member device 6A-R can engage in any of the relevant behaviors in response to any member device 6A-R entering a low battery mode 239. Any member devices 6A-R can act in concert, in compliment, or in contrast to the behavior of another member device 6A-R responding to any member device 6A-R entering a low battery mode 239: some member device 6A may emit more illumination lighting 19, while some member device 6B may stop emitting illumination lighting 19; some member devices 6C-G may emit illumination lighting 19 in a collective pattern, or at random; some occupancy device 45A may active or increase sensitivity, while other occupancy devices 45B may deactivate or decrease sensitivity; a control station 20 may unlock to allow for non-authorized users to perform extraordinary functions, or the control station 20 may lock and prohibit users from performing even basic functions until the low battery mode 239 is resolved. Further, any and all of the behavior of member devices 6A-R can be configured by appropriate users or technicians, either using onsite tools and interfaces, or remote devices via the WAN 55 or another access point to the lighting control network 5.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element. The number of elements presented within a process, method, article, or apparatus are, without further constraints, for illustrative purposes only: It shall be understood that elements may be repeated, reduced in number, combined, or subdivided without undue experimentation in order to function in a particular setting.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A luminaire configured to be included in a lighting control group, the luminaire comprising:
   a luminaire network communication interface system configured for communication via a lighting control network over a lighting control network communication channel for lighting control and systems operations;
   a luminaire light source to emit illumination lighting;
   a luminaire driver circuit coupled to the luminaire light source to control light source operation of the luminaire light source;
   a luminaire power supply driven by a power line;
   a luminaire processor coupled to the luminaire network communication interface system and the luminaire driver circuit;
   a luminaire memory accessible to the luminaire processor and including a battery level threshold; and
   luminaire programming in the luminaire memory, wherein execution of the luminaire programming by the luminaire processor configures the luminaire to implement functions, including functions to:
   receive a lighting control message;
   track: (i) a time measurement, (ii) a count of total switch activations, (iii) a count of a number of lighting control messages received, or (iv) combination thereof since a battery power source of a power switch has been restored;
   determine a battery level of the power switch using: (i) the time measurement, (ii) the count of total switch activations, (iii) the count of the number of lighting control messages received, or (iv) combination thereof; and
   in response to the battery level of the power switch being less than the battery level threshold, control the luminaire to enter a low battery mode.

2. A lighting control system, comprising:
   the luminaire of claim 1;
   wherein the power switch is configured to transmit, via the lighting control network, the lighting control message to the lighting control group.

3. A lighting control system, comprising:
the luminaire of claim 1;
wherein the power switch is configured to transmit, via the lighting control network, the lighting control message to the lighting control group in response to an activation of the power switch.

4. The luminaire of claim 1, wherein:
execution of the luminaire programming by the luminaire processor further configures the luminaire to implement functions, including functions to:
during the low battery mode, control the luminaire light source, via the luminaire driver circuit, to emit the illumination lighting.

5. The luminaire of claim 1, wherein:
the lighting control message includes a reported battery level; and
the function to determine the battery level of the power switch includes using a reported battery level included with the lighting control message.

6. The luminaire of claim 4, wherein:
the function to control the luminaire to enter the low battery mode further includes in response to a respective battery level of each power switch in a plurality of power switches being less than the battery level threshold, control the luminaire to enter the low battery mode.

7. The luminaire of claim 1, wherein:
execution of the luminaire programming by the luminaire processor further-causes configures the luminaire to:
in response to receiving a battery energized message, leave the low battery mode.

8. A lighting control system, comprising:
the luminaire of claim 1;
wherein the power switch comprises:
a power switch network communication interface system configured for communication via the lighting control network;
a power switch power supply driven by a non-line power source;
a power switch processor coupled to the power switch network communication interface system;
a power switch memory accessible to the power switch processor; and
power switch programming in the power switch memory, wherein execution of the power switch programming by the power switch processor configures the power switch to implement functions, including functions to: transmit, via the lighting control network, the lighting control message to the lighting control group.

9. The luminaire of claim 1, wherein:
execution of the luminaire programming by the luminaire processor further-causes configures the luminaire to:
in response to receiving the lighting control message, determine a count of line control member devices of a plurality of member devices, each of the line control member devices including:
a line control power supply driven by a line power source; and
the power switch programming in a line control memory; and
in response to the count of line control member devices equaling zero and the battery level of the power switch being less than the battery level threshold, enter the low battery mode.

10. A lighting control system, comprising:
the luminaire of claim 1;
wherein the power switch is configured to be included in the lighting control group, the power switch comprising:
a power switch network communication interface system for network communications;
a power switch power supply driven by a non-line power source;
a power switch processor coupled to the power switch network communication interface system;
a power switch memory accessible to the power switch processor; and
power switch programming in the power switch memory, wherein execution of the power switch programming by the power switch processor configures the power switch to: periodically transmit, via the lighting control network, a heartbeat message to the lighting control group.

11. The lighting control system of claim 10, wherein:
the power switch memory includes a messaging battery level threshold; and
execution of the power switch programming by the power switch processor further configures the power switch to:
in response to the battery level of the power switch being less than the messaging battery level threshold, periodically transmit, via the lighting control network, the heartbeat message to the lighting control group.

12. The lighting control system of claim 10, wherein:
the power switch memory includes a messaging battery level threshold; and
execution of the power switch programming by the power switch processor further configures the power switch to:
in response to the battery level of the power switch being greater than the messaging battery level threshold, stop periodically transmitting, via the lighting control network, the heartbeat message to the lighting control group.

13. A member device configured to be included in a lighting control group, the member device comprising:
a network communication interface system for network communications;
a power supply driven by a non-line power source;
a processor coupled to the network communication interface system;
a memory accessible to the processor, wherein the memory includes programming, a first messaging battery level threshold, and a second messaging battery level threshold; and
wherein execution of the programming by the processor configures the member device to:
determine a battery level of the member device;
in response to the battery level of the member device being less than the first messaging battery level threshold, periodically transmit, via a lighting control network, a heartbeat message to the lighting control group, at a first periodicity; and
in response to the battery level of the member device being less than the second messaging battery level threshold, periodically transmit, via the lighting control network, the heartbeat message to the lighting control group, at a second periodicity.

14. A member device configured to be included in a lighting control group, the member device comprising:
a network communication interface system for network communications;

a power supply driven by a non-line power source;
a processor coupled to the network communication interface system;
a memory accessible to the processor, wherein the memory includes programming and a messaging battery level threshold; and
wherein execution of the programming by the processor configures the member device to:
   periodically transmit, via a lighting control network, a heartbeat message to the lighting control group until the non-line power source enters a depleted state; and
   in response to a restoration of the non-line power source removing the non-line power source from the depleted state, periodically transmit, via the lighting control network, the heartbeat message to the lighting control group.

15. A lighting control system, comprising:
a member device configured to be included in a lighting control group, the member device comprising:
   a network communication interface system for network communications;
   a power supply driven by a non-line power source;
   a processor coupled to the network communication interface system;
   a memory accessible to the processor; and
   programming in the memory, wherein execution of the programming by the processor configures the member device to:
      periodically transmit, via a lighting control network, a heartbeat message to the lighting control group; and
a luminaire comprising:
   a luminaire network communication interface system for network communications;
   a luminaire light source to emit lighting;
   a driver circuit coupled to the luminaire light source to control light source operation of the luminaire light source;
   a luminaire processor coupled to the luminaire network communication interface system;
   a luminaire memory accessible to the luminaire processor and including a heartbeat periodicity threshold; and
   luminaire programming in the luminaire memory, wherein execution of the luminaire programming by the luminaire processor causes the luminaire to:
      receive the heartbeat message;
      determine a heartbeat periodicity of the member device based on a number of heartbeat messages received in a period of time; and
      in response to the heartbeat periodicity of the member device being less than the heartbeat periodicity threshold, enter a low battery mode.

* * * * *

UNITED STATES PATENT AND TRADEMARK OFFICE
CERTIFICATE OF CORRECTION

| | | |
|---|---|---|
| PATENT NO. | : 12,336,079 B2 | Page 1 of 1 |
| APPLICATION NO. | : 18/108936 | |
| DATED | : June 17, 2025 | |
| INVENTOR(S) | : Richard L. Westrick, Jr. et al. | |

It is certified that error appears in the above-identified patent and that said Letters Patent is hereby corrected as shown below:

In the Claims

In Column 33, Claim 6, Line 21, delete "claim 4" and insert -- claim 1 --

In Column 33, Claim 7, Line 29, delete "further-causes" and insert -- further configures --

In Column 33, Claim 9, Line 53, delete "further-causes" and insert -- further configures --

Signed and Sealed this
Ninth Day of September, 2025

Coke Morgan Stewart
*Acting Director of the United States Patent and Trademark Office*